United States Patent
Cittadino et al.

(10) Patent No.: US 10,215,270 B2
(45) Date of Patent: Feb. 26, 2019

(54) AUTOMATED PRODUCT DISPENSERS AND RELATED METHODS FOR ISOLATING A DRIVE ASSEMBLY TO INHIBIT VIBRATION TRANSMISSION

(71) Applicant: GPCP IP Holdings LLC

(72) Inventors: Antonio Michael Cittadino, Appleton, WI (US); Mark Edwin Peters, New London, WI (US)

(73) Assignee: GPCP IP HOLDINGS LLC, Atlanta, GA (US)

( * ) Notice: Subject to any disclaimer, the term of this patent is extended or adjusted under 35 U.S.C. 154(b) by 155 days.

(21) Appl. No.: 15/264,683

(22) Filed: Sep. 14, 2016

(65) Prior Publication Data

US 2017/0074388 A1 Mar. 16, 2017

Related U.S. Application Data

(60) Provisional application No. 62/218,004, filed on Sep. 14, 2015.

(51) Int. Cl.
| | |
|---|---|
| *F16H 57/028* | (2012.01) |
| *A47K 10/34* | (2006.01) |
| *F16H 57/025* | (2012.01) |
| *B65H 16/00* | (2006.01) |
| *A47K 10/32* | (2006.01) |

(52) U.S. Cl.
CPC ............ *F16H 57/028* (2013.01); *A47K 10/34* (2013.01); *B65H 16/005* (2013.01); *F16H 57/025* (2013.01); *A47K 2010/3233* (2013.01); *B65H 2402/43* (2013.01); *B65H 2402/521* (2013.01); *B65H 2402/632* (2013.01); *B65H 2404/143* (2013.01); *B65H 2601/521* (2013.01); *B65H 2601/5242* (2013.01); *B65H 2701/1924* (2013.01)

(58) Field of Classification Search
CPC ............ A47K 2010/3233; A47K 10/36; A47K 10/3687
See application file for complete search history.

(56) References Cited

U.S. PATENT DOCUMENTS

| | | | |
|---|---|---|---|
| 2,935,273 A | 5/1960 | Hoeffgen et al. |
| 4,323,902 A | 4/1982 | Hussey et al. |
| 4,738,176 A | 4/1988 | Cassia |
| 5,657,666 A | 8/1997 | Tsuda et al. |

(Continued)

OTHER PUBLICATIONS

International Search Report and Written Opinion of the International Searching Authority, dated Dec. 28, 2016 in International Patent Application No. PCT/US2016/050591.

*Primary Examiner* — Jeremy Carroll
(74) *Attorney, Agent, or Firm* — Eversheds Sutherland (US) LLP

(57) ABSTRACT

An automated product dispenser for dispensing a product from a supply of product is provided. The automated product dispenser includes a chassis assembly, a drive assembly, and an isolation member. The chassis assembly includes a chassis frame, and the drive assembly includes a motor, a drivetrain, and a drivetrain housing. The isolation member mounts the drive assembly to the chassis assembly such that the drive assembly is substantially spaced apart from the chassis frame. A related method of inhibiting vibration transmission in an automated product dispenser also is provided.

34 Claims, 32 Drawing Sheets

(56) References Cited

U.S. PATENT DOCUMENTS

| | | |
|---|---|---|
| 6,497,267 B1 | 12/2002 | Azar et al. |
| 7,380,748 B2 | 6/2008 | Goeking et al. |
| 7,621,730 B2 | 11/2009 | Del Rio et al. |
| 8,261,942 B2 * | 9/2012 | Chen .................... G01F 11/029 |
| | | 222/181.3 |
| 8,616,489 B2 | 12/2013 | Goeking et al. |
| 8,746,510 B2 | 6/2014 | Cittadino et al. |
| 8,777,149 B2 | 7/2014 | Goeking et al. |
| 2002/0074477 A1 | 6/2002 | Doyle et al. |
| 2005/0047945 A1 * | 3/2005 | Metzger ................ F04D 29/626 |
| | | 417/423.14 |
| 2010/0286817 A1 * | 11/2010 | Goeking ................ A47K 10/26 |
| | | 700/231 |
| 2013/0302144 A1 | 11/2013 | Demtroder et al. |
| 2014/0326477 A1 | 11/2014 | Thorson et al. |
| 2015/0238056 A1 * | 8/2015 | Fellhoelter ......... A47K 10/3687 |
| | | 242/560 |
| 2018/0064297 A1 * | 3/2018 | Goeking ............ A47K 10/3625 |

* cited by examiner

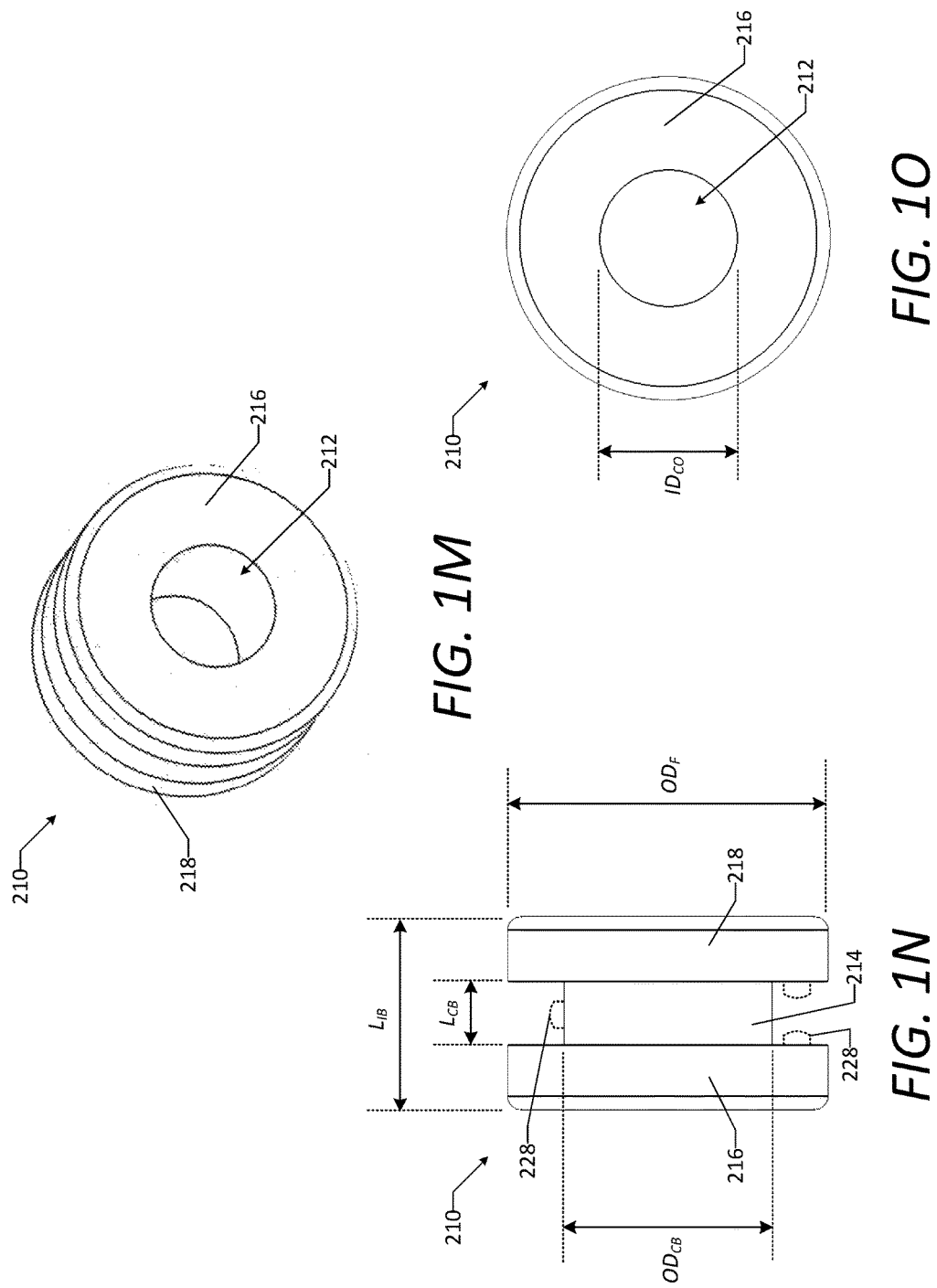

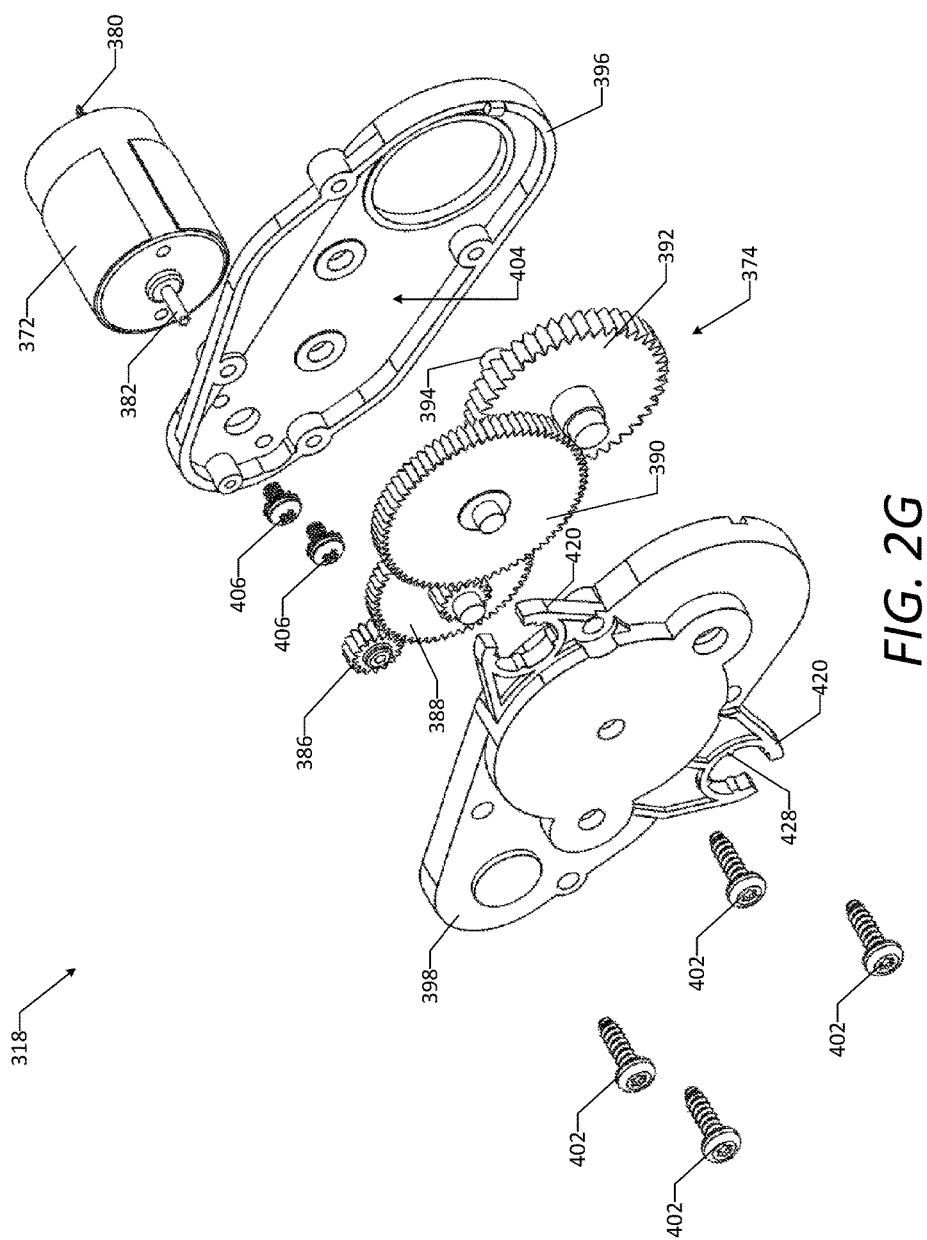

AUTOMATED PRODUCT DISPENSERS AND RELATED METHODS FOR ISOLATING A DRIVE ASSEMBLY TO INHIBIT VIBRATION TRANSMISSION

CROSS-REFERENCE TO RELATED APPLICATIONS

This application claims the benefit of U.S. Provisional Application No. 62/218,004, filed on Sep. 14, 2015, which is incorporated by reference herein in its entirety.

FIELD OF THE DISCLOSURE

The present disclosure relates generally to product dispensers and more particularly to automated product dispensers and related methods for isolating a drive assembly of a dispenser to inhibit transmission of vibrations and sound from a motor and a drivetrain of the drive assembly to other components of the dispenser.

BACKGROUND

Various types of product dispensers are known in the art, including mechanical and automated dispensers configured to dispense a product from a supply of product supported by the dispenser. For example, sheet product dispensers may be configured to allow a user to obtain a particular type of sheet product, such as paper towels, bath tissue, facial tissue, napkins, or wipers, from a supply of sheet product supported by the dispenser. The supply of sheet product may be in the form of a roll of sheet product, a stack of sheet product, or other configuration for storing the sheet product prior to dispensing from the dispenser. As another example, flowable material dispensers may be configured to allow a user to obtain a particular type of flowable material, such as a liquid, gel, or foam soap, a liquid, gel, or foam detergent, a liquid, gel, or foam lotion, a sanitizer liquid, gel, or foam, or an antimicrobial liquid, gel, or foam, from a supply of flowable material supported by the dispenser. The supply of flowable material may be provided in a container for storing the flowable material prior to dispensing from the dispenser. Still other examples of product dispensers include cutlery dispensers configured to dispense cutlery utensils, such as disposable forks, knives, or spoons, and air freshener dispensers configured to dispense an air freshener substance, such as an odor combating substance, an odor neutralizing substance, or a fragrance.

Automated product dispensers generally may be configured to automatically dispense a particular product to a user or a surrounding environment upon user actuation of the dispenser, upon the dispenser sensing the presence of a user, or based on a timer schedule of the dispenser. Certain automated product dispensers may include an automated dispensing mechanism that includes a motor and a drivetrain. Upon activation of the dispensing mechanism, the motor may drive the drivetrain, which in turn may drive or otherwise actuate other components of the dispensing mechanism to dispense the particular product to a user or a surrounding environment. For example, a dispensing mechanism of an automated sheet product dispenser may include a drive roller that is driven via a drivetrain to dispense a sheet product to a user. As another example, a dispensing mechanism of an automated flowable material dispenser may include a pump that is actuated via a drivetrain to dispense a flowable material to a user.

One problem associated with certain automated product dispensers is the level of sound emitted during operation of the automated dispensing mechanism (i.e., during dispensing of the particular product). For automated dispensing mechanisms that include a motor and a drivetrain, relatively high sound power levels may be emitted due, at least in part, to vibrations generated by the motor and the drivetrain, which are transmitted to other components of the dispenser, such as a chassis or a housing. In certain applications, the relatively high sound power levels may be obtrusive to people present in the working environment of the dispenser or may negatively affect user perception of the dispenser. Additionally, the vibrations transmitted to other components of the dispenser may negatively affect the function or integrity of such components.

There is thus a desire for improved automated product dispensers including an automated dispensing mechanism that includes a motor and a drivetrain, as well as related methods for automatically dispensing products therewith. Such dispensers and methods should address the problem of relatively high sound power levels emitted due to vibrations generated by the motor and the drivetrain and transmitted to other components of the dispenser.

SUMMARY

In one aspect, an automated product dispenser for dispensing a product from a supply of product is provided. According to one embodiment, the automated product dispenser includes a chassis assembly, a drive assembly, and an isolation member. The chassis assembly includes a chassis frame, and the drive assembly includes a motor, a drivetrain, and a drivetrain housing. The isolation member mounts the drive assembly to the chassis assembly such that the drive assembly is substantially spaced apart from the chassis frame.

In another aspect, a method of inhibiting vibration transmission in an automated product dispenser is provided. According to one embodiment, the method includes the steps of providing a drive assembly including a motor, a drivetrain, and a drivetrain housing, and mounting the drive assembly to a chassis frame of an automated product dispenser via an isolation member such that the drive assembly is substantially spaced apart from the chassis frame.

In still another aspect, an automated product dispenser for dispensing a product from a supply of product is provided. According to one embodiment, the automated product dispenser includes a chassis assembly, a drive assembly, and an isolation member. The chassis assembly includes a chassis frame, and the drive assembly includes a motor, a drivetrain, and a drivetrain housing. The isolation member mounts the drive assembly to the chassis assembly such that the drive assembly is substantially spaced apart from the chassis frame. The isolation member is an isolation bushing disposed between the drive assembly and the chassis assembly such that the drive assembly is entirely spaced apart from the chassis frame, or an isolation mount associated with the drivetrain housing, the isolation mount including a hub and a plurality of spokes attached to the hub.

In another aspect, an automated product dispenser for dispensing a product from a supply of product is provided. According to one embodiment, the automated product dispenser includes a chassis assembly, a drive assembly, and an isolation bushing disposed between the drive assembly and the chassis assembly. The chassis assembly includes a chassis frame, and the drive assembly includes a motor, a drivetrain, and a drivetrain housing. The drive assembly is mounted to the chassis assembly via the isolation bushing such that the drive assembly is entirely spaced apart from the chassis frame.

In another aspect, a method of inhibiting vibration transmission in an automated product dispenser is provided. According to one embodiment, the method includes the steps of providing a drive assembly including a motor, a drivetrain, and a drivetrain housing, and mounting the drive assembly to a chassis frame of an automated product dispenser via an isolation bushing such that the drive assembly is entirely spaced apart from the chassis frame.

In still another aspect, an automated product dispenser for dispensing a product from a supply of product is provided. According to one embodiment, the automated product dispenser includes a chassis frame, a drivetrain housing, a drivetrain disposed within the drivetrain housing, and a first isolation bushing. The chassis frame includes a first mounting post, and the drivetrain housing includes a first bushing support. The first isolation bushing is disposed at least partially over the first mounting post and at least partially within the first bushing support. The drivetrain housing is entirely spaced apart from the chassis frame.

In another aspect, an automated product dispenser for dispensing a product from a supply of product is provided. According to one embodiment, the automated product dispenser includes a chassis assembly and a drive assembly. The chassis assembly includes a chassis frame, and the drive assembly includes a motor, a drivetrain, and a drivetrain housing. The drivetrain housing includes an isolation mount including a hub and a number of spokes attached to the hub. The drive assembly is mounted to the chassis assembly via the isolation mount.

In still another aspect, a method of inhibiting vibration transmission in an automated product dispenser is provided. According to one embodiment, the method includes the step of providing a drive assembly including a motor, a drivetrain, and a drivetrain housing. The drivetrain housing includes an isolation mount including a hub and a number of spokes attached to the hub. The method further includes mounting the drive assembly to a chassis frame of an automated product dispenser via the isolation mount.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

FIG. 1M is a detailed perspective view of the isolation bushing.

FIG. 1N is a detailed side view of the isolation bushing.

FIG. 1O is a detailed end view of the isolation bushing.

FIG. 2G is a detailed exploded perspective view of the drive assembly, showing the motor, the drivetrain housing, the housing fasteners, a drivetrain, and motor fasteners of the drive assembly.

FIG. 3I is a detailed perspective view of the motor, the drivetrain, and an inner portion of the drive assembly.

DETAILED DESCRIPTION

Figure 1A:
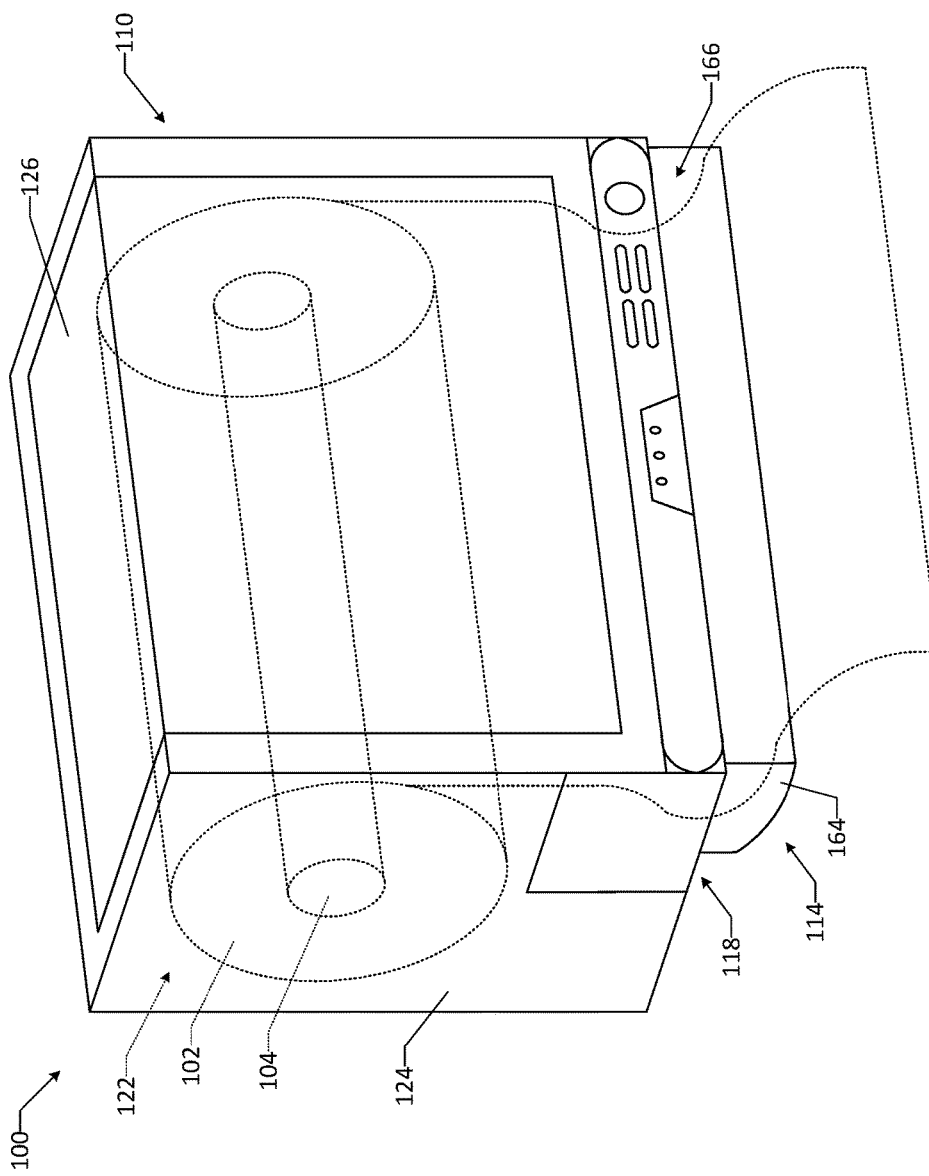
FIG. 1A is a perspective view of an automated sheet product dispenser in accordance with one or more embodiments of the disclosure, showing a dispenser housing, a chassis assembly, and a drive assembly of the dispenser.

The automated product dispensers and related methods provided herein advantageously limit sound power levels emitted during operation of an automated dispensing mechanism including a motor and a drivetrain. As described in detail below, the motor and the drivetrain may be provided as a part of a drive assembly that is mounted to a chassis assembly in a manner that isolates the drive assembly and inhibits transmission of vibrations and sound generated by the motor and the drivetrain to other components of the dispenser. Accordingly, as compared to existing dispensers, the automated product dispensers provided herein may emit lower sound power levels during dispensing of a product therefrom. According to various embodiments, the automated product dispensers may be automated sheet product dispensers, automated flowable material dispensers, automated cutlery dispensers, automated air freshener dispensers, or other types of automated product dispensers.

The present disclosure includes non-limiting embodiments of automated product dispensers and related methods for isolating a drive assembly to reduce vibration transmission. The embodiments are described in detail herein to enable one of ordinary skill in the art to practice the automated product dispensers and related methods, although it is to be understood that other embodiments may be utilized and that logical changes may be made without departing from the scope of the disclosure. Reference is made herein to the accompanying drawings illustrating some embodiments of the disclosure, in which use of the same reference numerals indicates similar or identical items. Throughout the disclosure, depending on the context, singular and plural terminology may be used interchangeably.

As used herein, the term "sheet product" refers to a product that is relatively thin in comparison to its length and width and exhibits a relatively flat, planar configuration, yet is flexible or bendable to permit folding, rolling, stacking, or the like. Example sheet products include towel, bath tissue, facial tissue, napkin, wipe, or other sheet-like products. Sheet products may be made from paper, cloth, non-woven, metallic, polymer or other materials, and in some cases may include multiple layers or plies. In some embodiments, the sheet product may be continuous sheet that is severable or separable into individual sheets using, for example, a tear bar or cutting blade, while in other cases the sheet product may include predefined areas of weakness, such as lines of perforations, that extend along the width of the sheet product to define individual sheets and facilitate separation or tearing.

As used herein, the term "flowable material" refers to any material, such as a liquid, gel, or foam material, that is able to move or be moved along in a flow. Examples of flowable materials include, but are not limited to, soap, sanitizer, shampoo, body wash, lotion, or other skincare products, condiments or other foodservice products, or cleaning products, whether in the form of a liquid, gel, foam, or combinations thereof. In some embodiments, the flowable material may be stored in one form, such as a liquid, and dispensed in another form, such as a foam.

As used herein, the phrase "entirely spaced apart," when used to describe a relationship between two features, components, or assemblies, means that no portion of the first feature, component, or assembly directly contacts any portion of the second feature, component, or assembly. For example, a statement herein that a drive assembly is entirely spaced apart from a chassis frame means that no portion of the drive assembly directly contacts any portion of the chassis frame.

As used herein, the phrase "substantially spaced apart," when used to describe a relationship between two features, components, or assemblies, means that either: (i) the first feature, component, or assembly is entirely spaced apart from second feature, component, or assembly (i.e., no portion of the first feature, component, or assembly directly contacts any portion of the second feature, component, or assembly); or (ii) the first feature, component, or assembly is spaced apart from second feature, component, or assembly except for an isolation mount. For example, a statement herein that a drive assembly is substantially spaced apart from a chassis frame means that either: (i) the drive assembly is entirely spaced apart from the chassis frame; or (ii) the drive assembly is spaced apart from the chassis frame except for an isolation mount.

The meanings of other terms used herein will be apparent to one of ordinary skill in the art or will become apparent to one of ordinary skill in the art upon review of the detailed description when taken in conjunction with the several drawings and the appended claims.

FIGS. 1A-1O illustrate an automated sheet product dispenser 100 (which also may be referred to herein as an "automated product dispenser," a "sheet product dispenser," or a "dispenser") according to one or more embodiments of the disclosure. The dispenser 100 is configured to dispense sheet product from a supply of sheet product supported thereby. In some embodiments, as shown, the dispenser 100 is configured to allow a user to obtain a length or article of sheet product from a roll 102 of sheet product (shown via hidden lines in FIG. 1A) supported by the dispenser 100. In other embodiments, the dispenser 100 is configured to allow a user to obtain a length or article of sheet product from a stack of sheet product supported by the dispenser 100. As described in detail below, the dispenser 100 is configured to limit sound power levels emitted by the dispenser 100 during dispensing of the sheet product.

The sheet product dispensed by the automatic sheet product dispenser 100 may be paper towels, bath tissue, facial tissue, napkins, wipes, or other types of sheet product, according to various embodiments. The roll 102 of sheet product may be formed in a conventional manner, whereby layers of the sheet product are wound around one another. The roll 102 may include a central opening 104 extending therethrough along a longitudinal axis of the roll 102. As shown, the roll 102 is a coreless roll of sheet product, such that the central opening 104 is defined by an inner layer of the sheet product. Alternatively, the roll 102 may be a cored roll of sheet product, including a core of paperboard or other material defining the central opening 104 and around which the layers of the sheet product are wound. In some embodiments, which may have a coreless or cored configuration, the roll 102 includes one or more removable shafts, plugs, or other members positioned within the central opening 104 for structural support during shipping or transportation, which may or may not be removed prior to loading the roll 102 in the dispenser 100.

In some embodiments, the sheet product includes predefined areas of weakness, such as lines of perforations, extending across a width of the sheet product between individual sheets thereof. In this manner, a user may separate one or more sheets from the roll 102 by tearing the sheet product along one of the areas of weakness. In other embodiments, the sheet product includes no predefined areas of weakness, such that the sheet product is formed as a continuous sheet. In this manner, a user may separate a length of sheet product from the roll 102 by tearing the sheet product at any desired location, as may be achieved by an abrupt pulling action and as may be facilitated by one or more features of the dispenser 100, such as a tear bar.

As shown in FIG. 1A, the automated sheet product dispenser 100 may include a dispenser housing 110, a chassis assembly 114, and a drive assembly 118. During use of the dispenser 100, the roll 102 may be disposed at least partially within the housing 110 for dispensing sheet product therefrom. In some embodiments, as shown, the housing 110 is configured to enclose the roll 102 of sheet product, such that the roll 102 is disposed entirely within the housing 110. The housing 110 may include a plurality of walls defining an interior space 122 inward of the walls and configured to receive the roll 102 therein. As shown, the housing 110 may include a base 124 (which also may be referred to herein as a "first dispenser housing portion") and a cover 126 (which also may be referred to herein as a "second dispenser housing portion"). In some embodiments, the base 124 is configured to attach to a wall or other support surface for mounting the dispenser 100 thereto. For example, a back wall of the base 124 may be attached to a vertical wall, a bottom wall of the base 124 may be attached to a countertop surface, or a top wall of the base 124 may be attached to an under-counter surface. The cover 126 may be movably connected to the base 124 and configured to move between a closed position for dispensing sheet product, as shown in FIG. 1A, and an open position for placing the roll 102 of sheet product within the interior space 122 of the dispenser 100. For example, the cover 126 may be pivotably connected to the base 124, such as via one or more hinges, or slidably connected to the base 124, such as via one or more rails.

The chassis assembly 114 may be disposed at least partially within the dispenser housing 110. In some embodiments, as shown in FIG. 1A, a portion of the chassis assembly 114 is disposed within the housing 110, while another portion of the chassis assembly 114 is disposed outside of the housing 110. For example, a chute of the chassis assembly 114 may be disposed outside of the housing 110 along an underside of the dispenser 100 so that a user may access the sheet product dispensed therefrom. In other embodiments, the chassis assembly 114 is disposed entirely within the housing 110. Alternatively, the chassis assembly 114 may be disposed entirely outside of but adjacent to and in communication with the dispenser housing 110. For example, the housing 110 may be disposed on top of and attached to the chassis assembly 114. In some embodiments, one or more exterior surfaces of the chassis assembly 114 form a portion of the exterior of the dispenser 100. In some embodiments, one or more interior surfaces of the chassis assembly 114, in conjunction with one or more interior surfaces of the walls of the housing 110, define the interior space 122 of the dispenser 100. In some embodiments, the dispenser 100 does not include a housing 110 at all, such that the roll 102 of sheet product is exposed atop the chassis assembly 114. In some embodiments, the chassis assembly 114 is configured to attach to a wall or other support surface for mounting the dispenser 100 thereto. For example, a back wall of the chassis assembly 114 may be attached to a vertical wall, a bottom wall of the chassis assembly 114 may be attached to a countertop surface, or a top wall of the chassis assembly 114 may be attached to an under-counter surface.

The drive assembly 118 may be mounted to the chassis assembly 114, as shown in FIGS. 1A-1D. Details of the mounting arrangement are described herein below. In some embodiments, as shown in FIG. 1A, a portion of the drive assembly 118 is disposed within the housing 110, while another portion of the drive assembly 118 is disposed outside of the housing 110. For example, a portion of a drivetrain housing of the drive assembly 118 may be disposed outside of the housing 110 such that the drivetrain housing defines a portion of the exterior of the dispenser 100. In other embodiments, the drive assembly 118 is disposed entirely within the housing 110. Alternatively, the drive assembly 118 may be disposed entirely outside of the dispenser housing 110. In some embodiments, as shown, one or more exterior surfaces of the drive assembly 118 form a portion of the exterior of the dispenser 100. The foregoing embodiments are merely illustrative, as other configurations of the dispenser housing 110, the chassis assembly 114, and the drive assembly 118 are possible.

Details of the chassis assembly 114 are illustrated in FIGS. 1B-1F. As shown, the chassis assembly 114 may include a chassis frame 132, which may be configured to support various other components of the chassis assembly 114 as well as other portions of the dispenser 100. The chassis frame 132 may include a back wall 134, a front wall 136, a first side wall 138, and a second side wall 140. In some embodiments, the walls 134, 136, 138, 140 of the chassis frame 132 may be integrally formed within one another. In other embodiments, the walls 134, 136, 138, 140 of the chassis frame 132 may be separately formed and attached to one another. The back wall 134 may be configured to attach to a wall or other support surface for mounting the dispenser 100 thereto. The front wall 136 may be configured to support a control panel, which may include one or more controllers, sensors, indicators, switches, and/or buttons for controlling operation of the dispenser 100. The first side wall 138 and the second side wall 140 may be configured to support the base 124 of the dispenser housing 110. The first side wall 138 also may be configured to support the drive assembly 118.

As shown, the chassis frame 132 may include one or more mounting posts 144 extending outwardly from the first side wall 138 and configured to allow the drive assembly 118 to be mounted thereto. Although a pair of mounting posts 144 is shown in the illustrated embodiment, any number of mounting posts 144 may be used. In some embodiments, the mounting posts 144 are integrally formed with the first side wall 138. In other embodiments, the mounting posts 144 are formed separately from and attached to the first side wall 138. As shown, each mounting post 144 may have an outer diameter $OD_{MP}$ and a length $L_{MP}$. In some embodiments, each mounting post 144 is generally tubular in shape, defining a central opening extending along a longitudinal axis of the post 144. According to other embodiments, the mounting posts 144 may have other shapes configured to mate with an isolation bushing as described below. The central opening may be configured to receive a portion of a fastener therein. For example, the central opening of the mounting post 144 may be threaded to receive a mating threaded fastener, such as a screw or a bolt. The chassis frame 132 also may include a motor opening 146 defined in the first side wall 138 and configured to receive a motor of the drive assembly 118 therein. Details of the mounting arrangement between the drive assembly 118 and the chassis assembly 114 are described herein below.

The chassis assembly 114 also may include a roller assembly 150 supported by the chassis frame 132 and configured to dispense the sheet product from the roll 102. The roller assembly 150 may include a drive roller 154 and a pinch roller 156 defining a nip therebetween for receiving and advancing the sheet product. As shown, the drive roller 154 may include a drive roller shaft 158, one or more drive roller sleeves 160 disposed over the drive roller shaft 158, and one or more rubber portions 162 disposed over the one or more drive roller sleeves 160. The drive roller 154 may be supported by and configured to rotate with respect to the chassis frame 132. As shown, a first end of the drive roller shaft 158 may extend through the first side wall 138 of the chassis frame 132 for attachment to the drive assembly 118, as described herein below. In a similar manner, a second end of the drive roller shaft 158 may extend through the second side wall 140 of the chassis frame 132.

As shown, the chassis assembly 114 also may include a dispensing chute 164 configured to guide the sheet product from the roller assembly 150 and out of the dispenser 100. The dispensing chute 164 may define a dispensing opening 166 configured to allow the sheet product to pass therethrough. In some embodiments, as shown, the dispensing opening 166 is disposed along a front of the chassis assembly 114. In other embodiments, the dispensing opening 166 may be disposed along other portions of the chassis assembly 114, such as along a bottom thereof. In some embodiments, as shown, the dispensing chute 164 is formed separately from and attached to the chassis frame 132. In other embodiments, the dispensing chute 164 is integrally formed with the chassis frame 132. The chassis assembly 114 also may include a tear bar 168 disposed about the dispensing opening 166 and configured to facilitate tearing of the sheet product by a user. In some embodiments, as shown, the tear bar 168 is formed separately from and attached to the chassis frame 132. In other embodiments, the tear bar 168 is integrally formed with the chassis frame 132. The foregoing embodiments are merely illustrative, as other configurations of the chassis assembly 114 are possible.

Details of the drive assembly 118 are illustrated in FIGS. 1B-1D and 1G-1L. As shown, the drive assembly 118 may include a motor 172, a drivetrain 174, and a drivetrain housing 176. The motor 172 may be an electric motor formed in a conventional manner and including a pair of wire connectors 180 and a motor output shaft 182. The drivetrain 174 may include a plurality of gears configured to be driven by the motor 172 and to drive the drive roller shaft 158. According to the illustrated embodiment, the drivetrain 174 may include a motor drive gear 186 (which also may be referred to herein as an "input gear"), a first intermediate gear 188, a second intermediate gear 190, and a drive roller gear 192 (which also may be referred to herein as an "output gear"). As shown, the motor drive gear 186 and the drive roller gear 192 may be single-step gears, and the first intermediate gear 188 and the second intermediate gear 190 may be two-step gears. The motor output shaft 182 may be coupled to and drive the motor drive gear 186. The motor drive gear 186 may engage and drive the first intermediate gear 188. The first intermediate gear 188 may engage and drive the second intermediate gear 190. The second intermediate gear 190 may engage and drive the drive roller gear 192. The drive roller gear 192 may be coupled to and drive the drive roller shaft 158. In this manner, operation of the motor 172 (i.e., rotation of the motor output shaft 182) may cause the drivetrain 174 to rotate the drive roller 154 for advancing the sheet product from the roll 102 and out of the dispenser 100.

The drivetrain housing 176 may enclose and support the drivetrain 174 therein. As shown, the drivetrain housing 176 may include an inner portion 196 (which also may be referred to herein as a "first drivetrain housing portion" or a "first portion") and an outer portion 198 (which also may be referred to herein as a "second drivetrain housing portion" or a "second portion"). The inner portion 196 and the outer portion 198 may be attached to one another via one or more housing fasteners 202. Although the housing fasteners 202 are shown as screws, other types of fasteners may be used. The inner portion 196 and the outer portion 198 of the drivetrain housing 176 may define an interior space 204 for receiving the drivetrain 174 therein. As shown in FIGS. 1I-1L, interior surfaces of the inner portion 196 and the outer portion 198 may be configured to receive and maintain the gears 186, 188, 190, 192 of the drivetrain 174 in a desired relationship for operation thereof. The motor 172 may be attached to and supported by the inner portion 196 of the drivetrain housing 176. In particular, as shown in FIG. 1J, the motor output shaft 182 may extend into the interior space 204 of the drivetrain housing 176 and the motor 172 may be attached to the inner portion 196 via one or more motor fasteners 206. Although the motor fasteners 206 are shown as screws, other types of fasteners may be used. The foregoing embodiments are merely illustrative, as other configurations of the drive assembly 118 are possible. The drive assembly 118 and the roller assembly 150 may be considered part of an automated dispensing mechanism of the automated sheet product dispenser 100.

As described above, the drive assembly 118 may be mounted to the chassis assembly 114. In particular, the drive assembly 118 may be mounted to the chassis assembly 114 via one or more isolation bushings 210 (which also may be referred to herein as "isolation grommets," "isolation mounts," or "isolation members"), as shown. Although a pair of isolation bushings 210 is shown in the illustrated embodiment, any number of isolation bushings 210 may be used. One of the isolation bushings 210 is illustrated in detail in FIGS. 1M-1O. As shown, the isolation bushing 210 may have a generally tubular (annular) shape and a circular cross-sectional shape, although other shapes may be used, for example, to optimize the stiffness of the isolation bushing 210. The isolation bushing 210 may include a central opening 212 extending therethrough along a longitudinal axis of the bushing 210. The central opening 212 may have an inner diameter $ID_{CO}$. As shown, the isolation bushing 210 may include a central body portion 214, a first flange 216 disposed at a first end of the bushing 210, and a second flange 218 disposed at a second end of the bushing 210. The central body portion 214 may have an outer diameter $OD_{CB}$, and the flanges 216, 218 may have an outer diameter $OD_F$ greater than the outer diameter $OD_{CB}$ of the central body portion 214. The central body portion 214 may have a length $L_{CB}$, and the isolation bushing 210 may have an overall length $L_{IB}$. The isolation bushing 210 may be formed of an elastomeric material, such as a polyurethane, silicone, thermoplastic elastomer, or natural or synthetic rubber, although other suitable materials may be used. In some embodiments, the isolation bushing 210 is formed of a material having a relatively low durometer. The foregoing embodiments are merely illustrative, as other configurations of the isolation bushing 210 are possible.

As shown, the drive assembly 118 may include one or more bushing supports 220 (which also may be referred to herein as "grommet supports" or "mount supports") configured to receive and support the one or more isolation bushings 210. In some embodiments, as shown in FIGS. 1J and 1L, the bushing supports 220 are part of the inner portion 196 of the drivetrain housing 176 or integrally formed therewith. In other embodiments, the bushing supports 220 are part of the outer portion 198 of the drivetrain housing 176 or integrally formed therewith. In still other embodiments, the bushing supports 220 may be formed separately from and attached to either the inner portion 196 or the outer portion 198 of the drivetrain housing 176. According to the illustrated embodiment, the bushing supports 220 are disposed along a periphery of the inner portion 196. Although a pair of bushing supports 220 is shown, any number of bushing supports 220 may be used to correspond to the number of isolation bushings 210 used.

As shown in FIGS. 1J and 1L, each bushing support 220 may define a bushing opening 222 configured to receive a portion of the corresponding isolation bushing 210 therein. In some embodiments, as shown, the bushing support 220 includes a pair of arms 224 defining at least a portion of the bushing opening 222 therebetween. The arms 224 may be oriented and shaped such that the bushing support 220 has a generally C-shaped profile. In some embodiments, as shown, a distance $D_1$ between tips of the arms 224 may be less than the outer diameter $OD_{CB}$ of the central body portion 214 of the isolation bushing 210. In this manner, the isolation bushing 210 may be inserted into the bushing opening 222 and retained therein by the arms 224. Alternatively, the arms 224 may be oriented and shaped such that the bushing support 220 has a generally U-shaped profile. The bushing opening 222 may be defined by a contact surface 226 of the bushing support 220 configured to contact a portion of the isolation bushing 210, such as the central body portion 214. As shown, the contact surface 226 may have a generally partial-circle-shaped profile. In some embodiments, an inner diameter $ID_{CS}$ of the profile of the contact surface 226 is less than the outer diameter $OD_{CB}$ of the central body portion 214 of the isolation bushing 210, such that the bushing support 220 slightly compresses or deflects the central body portion 214. In other embodiments, the inner diameter $ID_{CS}$ of the profile of the contact surface 226 is equal to or greater than the outer diameter $OD_{CB}$ of the central body portion 214 of the isolation bushing 210.

As shown, the bushing support 220 may include one or more protrusions 228 configured to contact a portion of the isolation bushing 210. In some embodiments, as shown in FIG. 1L, the bushing support 220 includes a plurality of the protrusions 228 disposed on the contact surface 226 and configured to contact the central body portion 214 of the bushing 210. The protrusions 228 may be formed as ridges, as shown, although other shapes of the protrusions 228, such as pins or partial spheres, may be used. In some embodiments, a distance $D_2$ between a tip of one of the protrusions and an opposing portion of the contact surface 226 is less than the outer diameter $OD_{CB}$ of the central body portion 214 of the isolation bushing 210, such that the bushing support 220 slightly compresses or deflects the central body portion 214. In some embodiments, the bushing support 220 alternatively or additionally includes one or more of the protrusions 228 disposed on an inner surface 232 or an outer surface 234 of the bushing support 220 and configured to contact the respective flange 216, 218 of the isolation bushing 210. In some such embodiments, a distance between a tip of one of the protrusions 228 and the opposite surface of the bushing support 220 (i.e., the inner surface 232 or the outer surface 234) is greater than the length $L_{CB}$ of the central body portion 214 (i.e., the distance between the flanges 216, 218), such that the bushing support 220 slightly deflects one or both of the flanges 216, 218. In some embodiments, the isolation bushing 210 includes one or more protrusions 228 (shown via dashed lines in FIG. 1N) configured to contact a portion of the bushing support 220, such that a portion of the bushing 210 is slightly compressed or deflected by the bushing support 220. Such protrusions 228 may be disposed on the central body portion 214, the first flange 216, and/or the second flange 218 of the isolation bushing 210. Ultimately, the protrusions 228 of the bushing support 220 and/or the isolation bushing 210 may be configured to affect the stiffness of the isolation bushing 210 in order to optimize the isolation bushing 210 for isolation of the drive assembly 118, as described below. The foregoing embodiments are merely illustrative, as other configurations of the isolation bushing 210 and the bushing support 220 are possible.

Figure 1B:
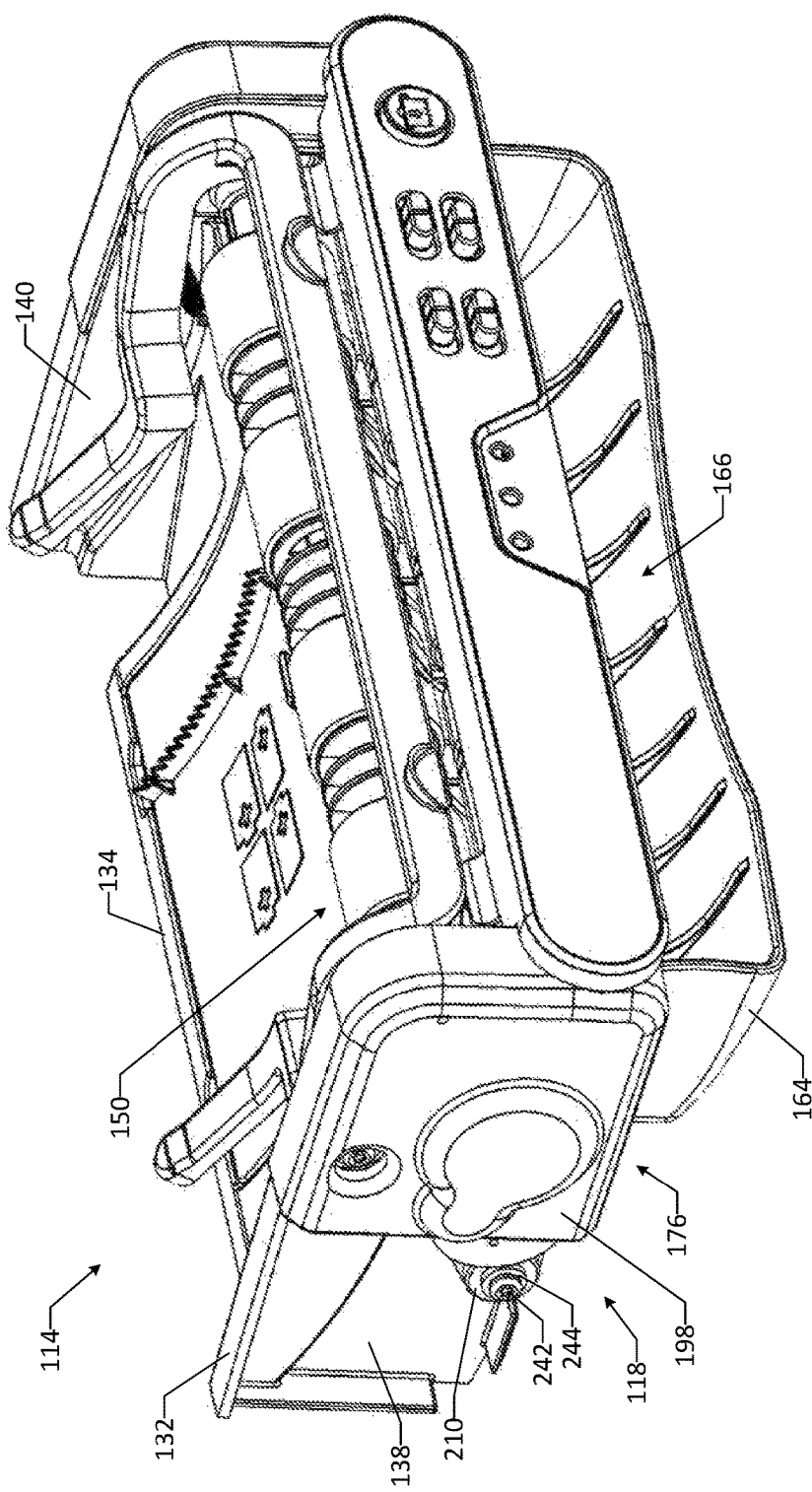
FIG. 1B is a detailed perspective view of the chassis assembly, the drive assembly, isolation bushings, mounting fasteners, and mounting washers of the automated sheet product dispenser of FIG. 1A.
Figure 1C:
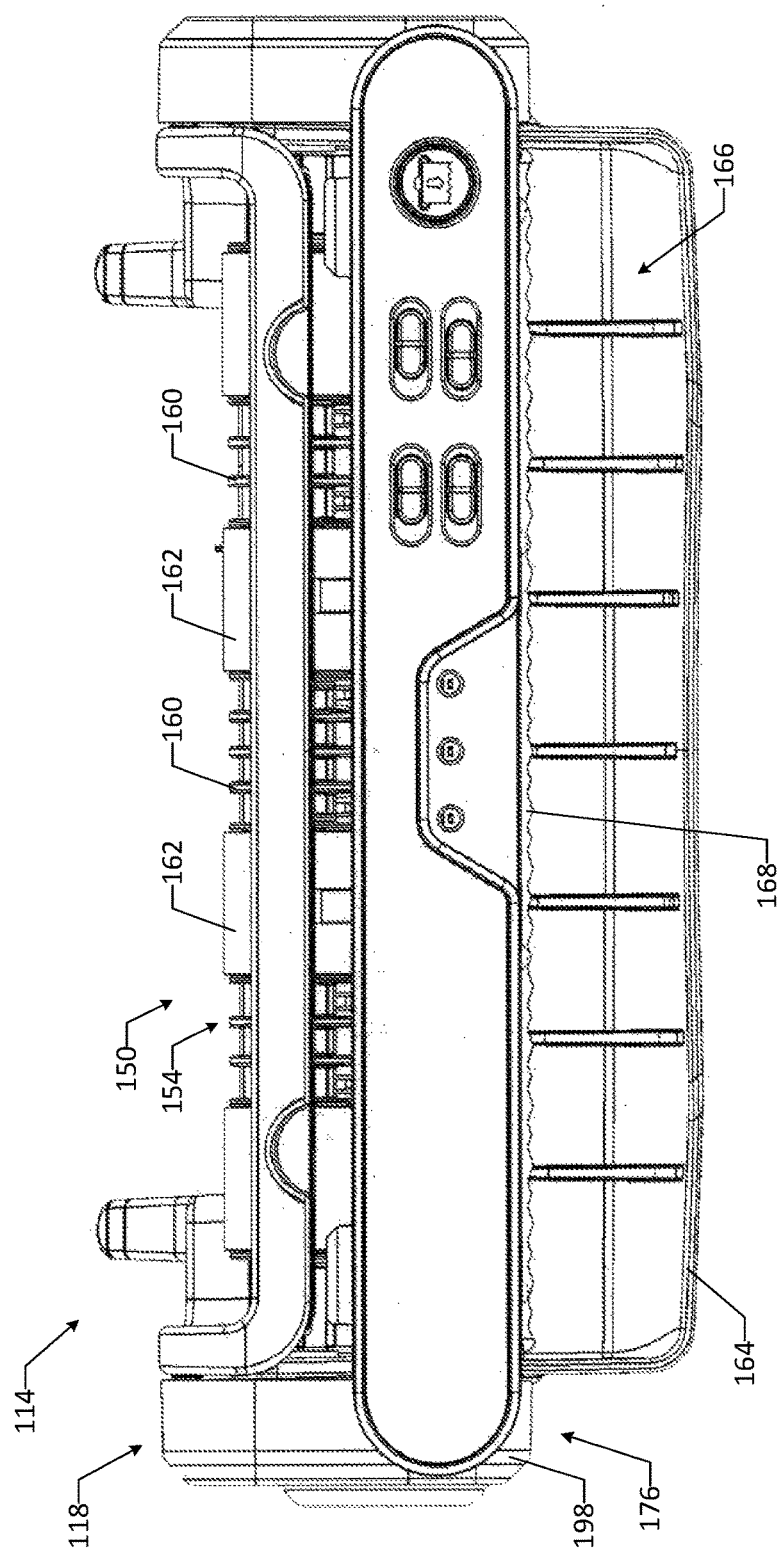
FIG. 1C is a detailed front view of the chassis assembly and the drive assembly of the automated sheet product dispenser of FIG. 1A.
Figure 1D:
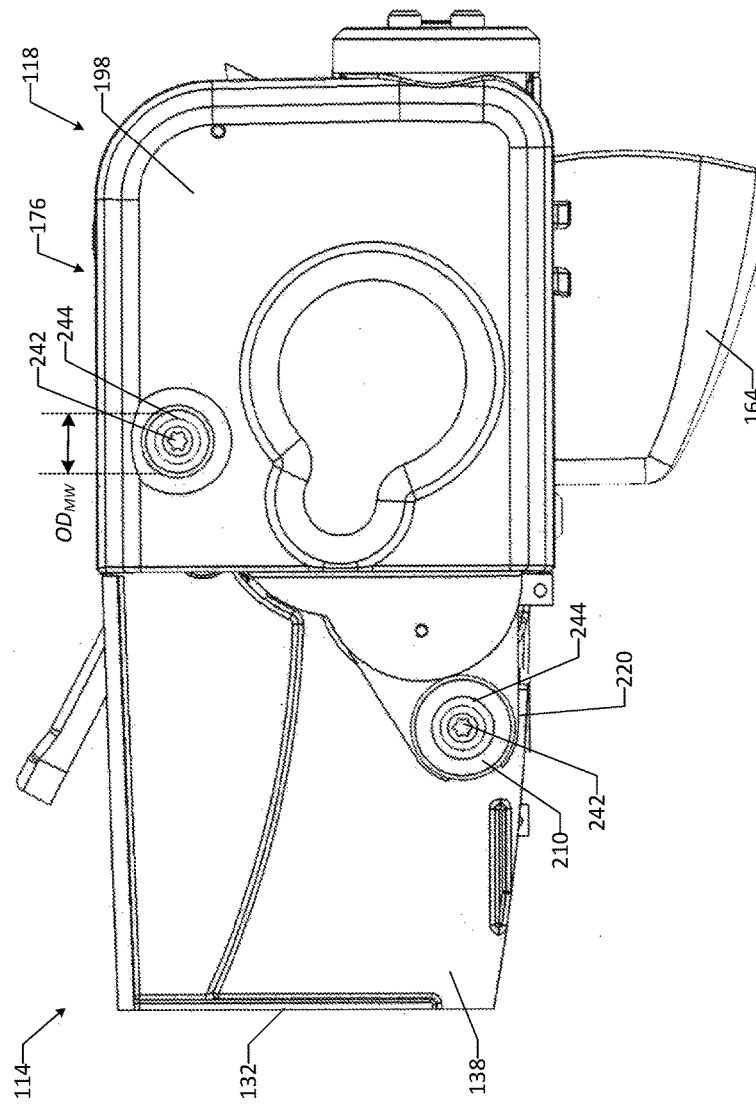
FIG. 1D is a detailed side view of the chassis assembly, the drive assembly, the isolation bushings, the mounting fasteners, and the mounting washers of the automated sheet product dispenser of FIG. 1A.
Figure 1E:
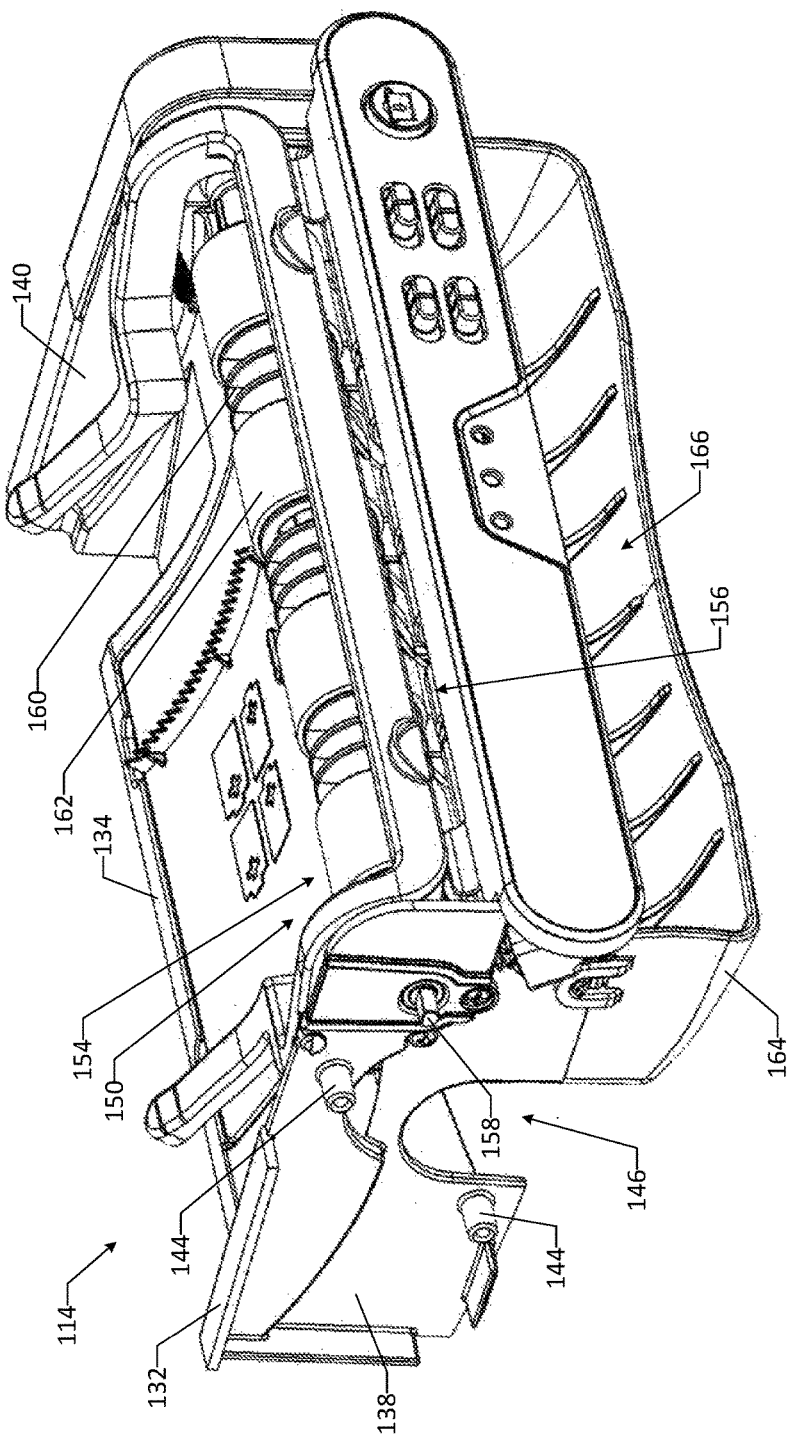
FIG. 1E is a detailed perspective view of the chassis assembly, showing a chassis frame, a roller assembly, and a dispensing chute of the chassis assembly.
Figure 1F:
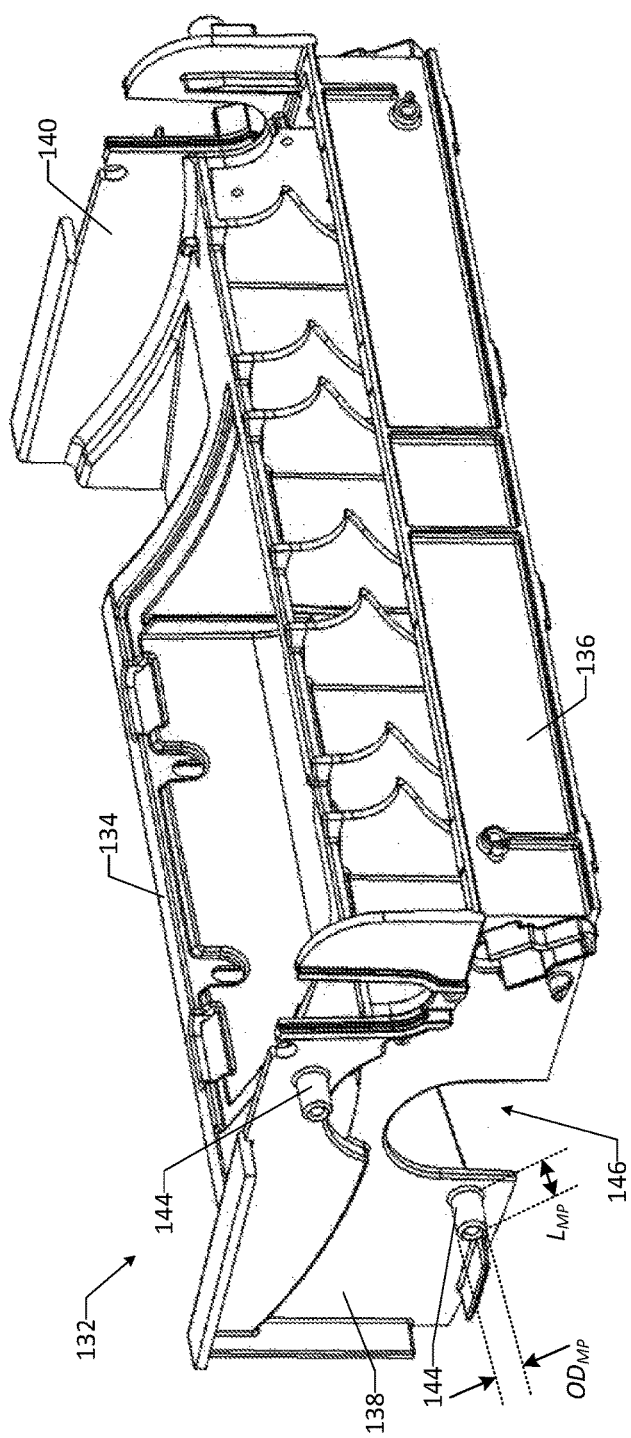
FIG. 1F is a detailed perspective view of the chassis frame of the chassis assembly.
Figure 1G:
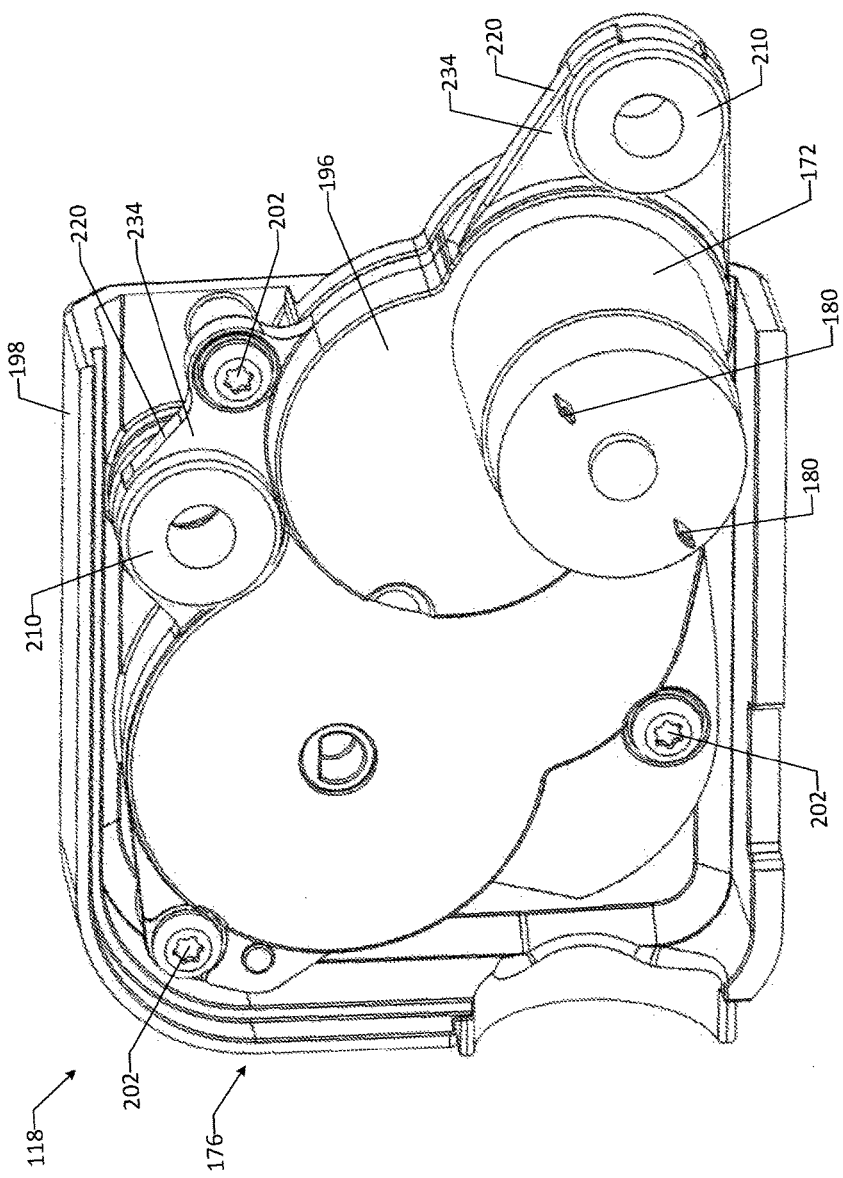
FIG. 1G is a detailed perspective view of the drive assembly and the isolation bushings, showing a motor and a drivetrain housing of the drive assembly.
Figure 1H:
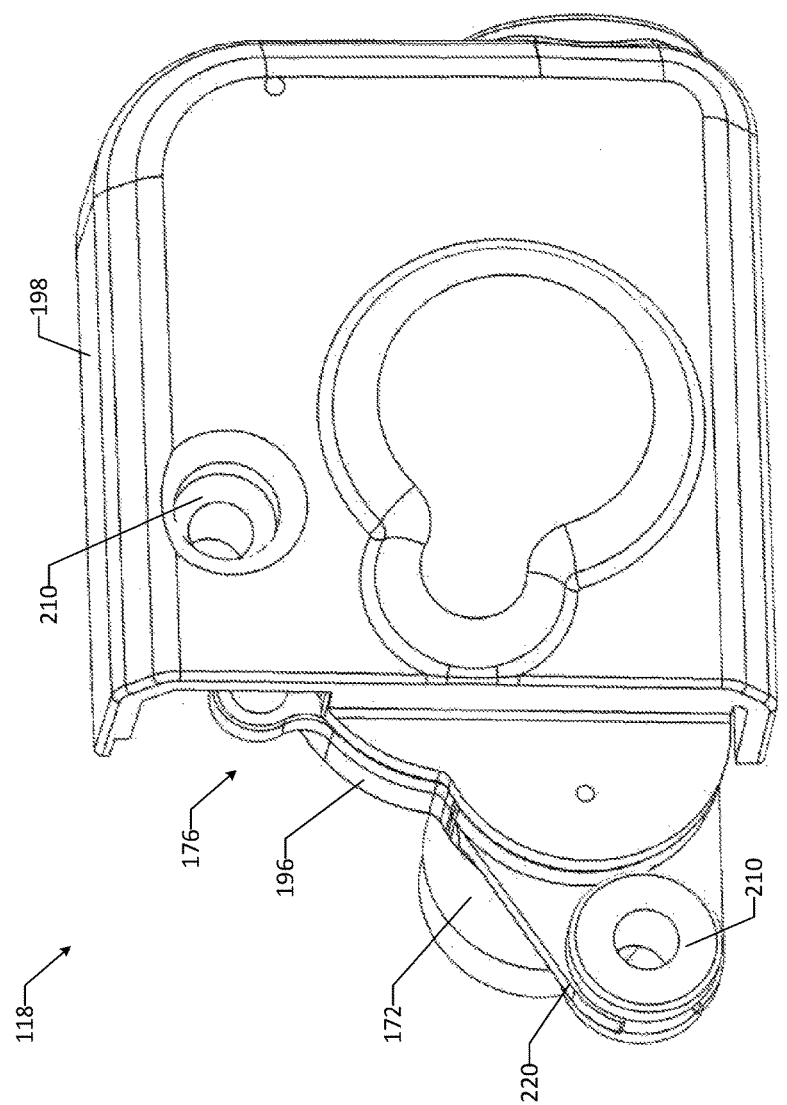
FIG. 1H is a detailed perspective view of the drive assembly and the isolation bushings, showing the motor and the drivetrain housing of the drive assembly.
Figure 1I:
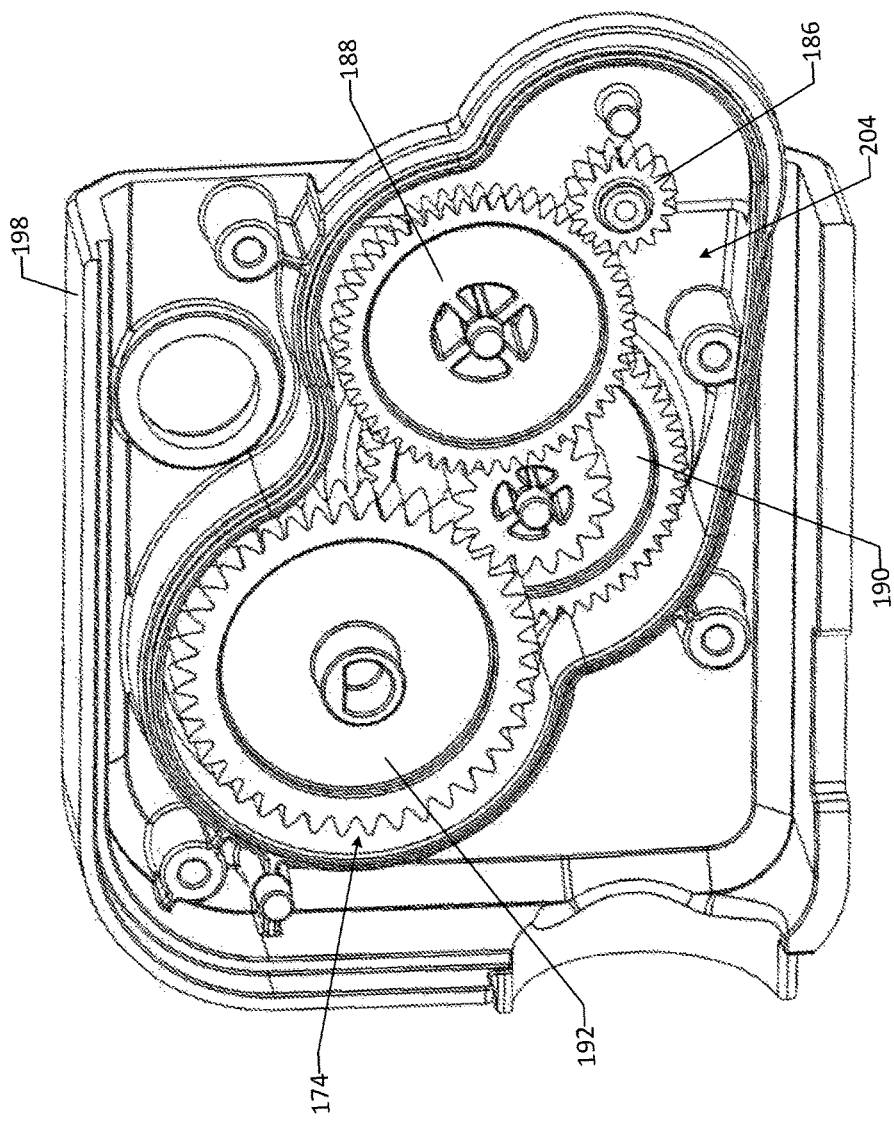
FIG. 1I is a detailed perspective view of a drivetrain and an outer portion of the drivetrain housing of the drive assembly.
Figure 1J:
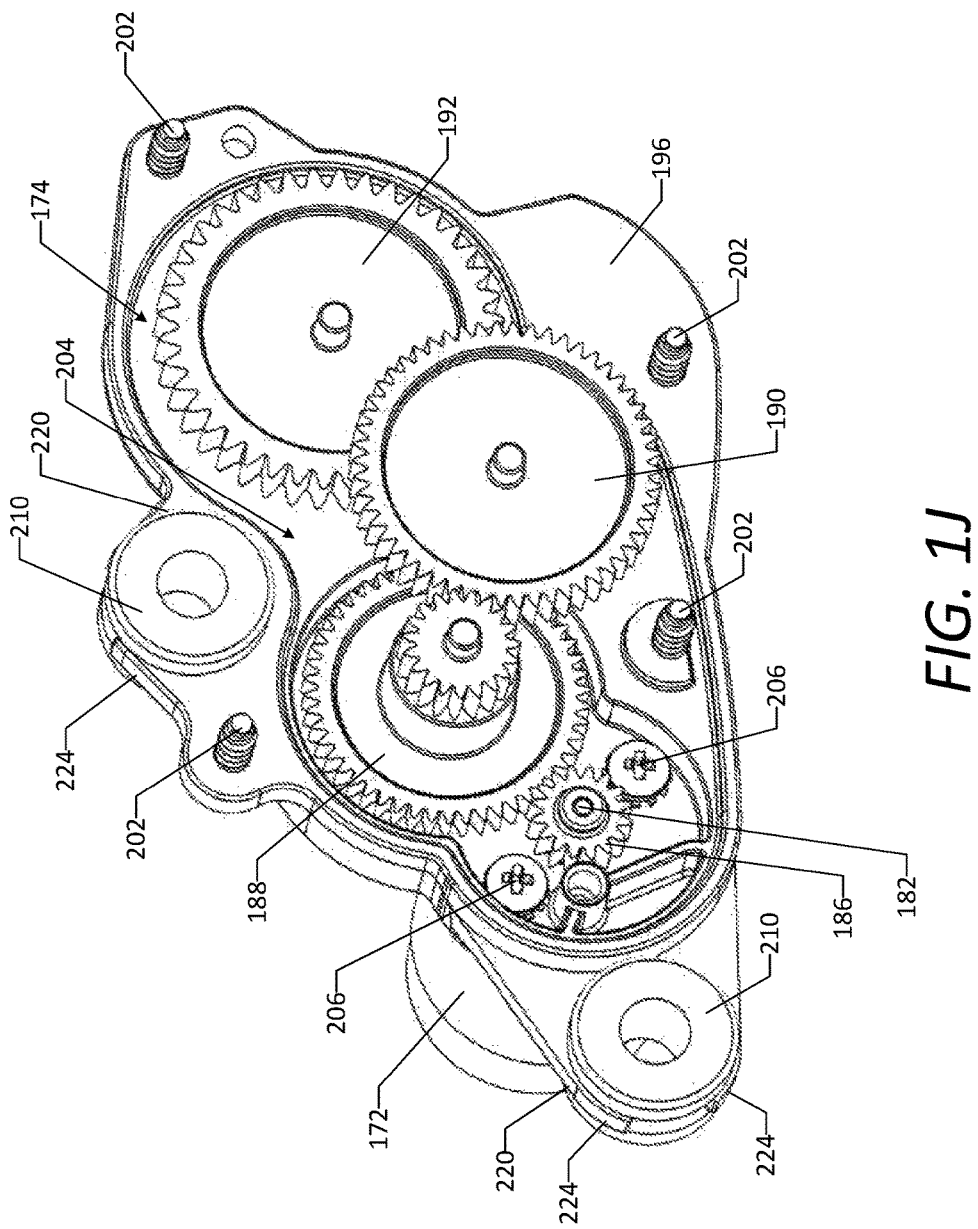
FIG. 1J is a detailed perspective view of the motor, the drivetrain, and an inner portion of the drive assembly, and the isolation bushings.
Figure 1K:
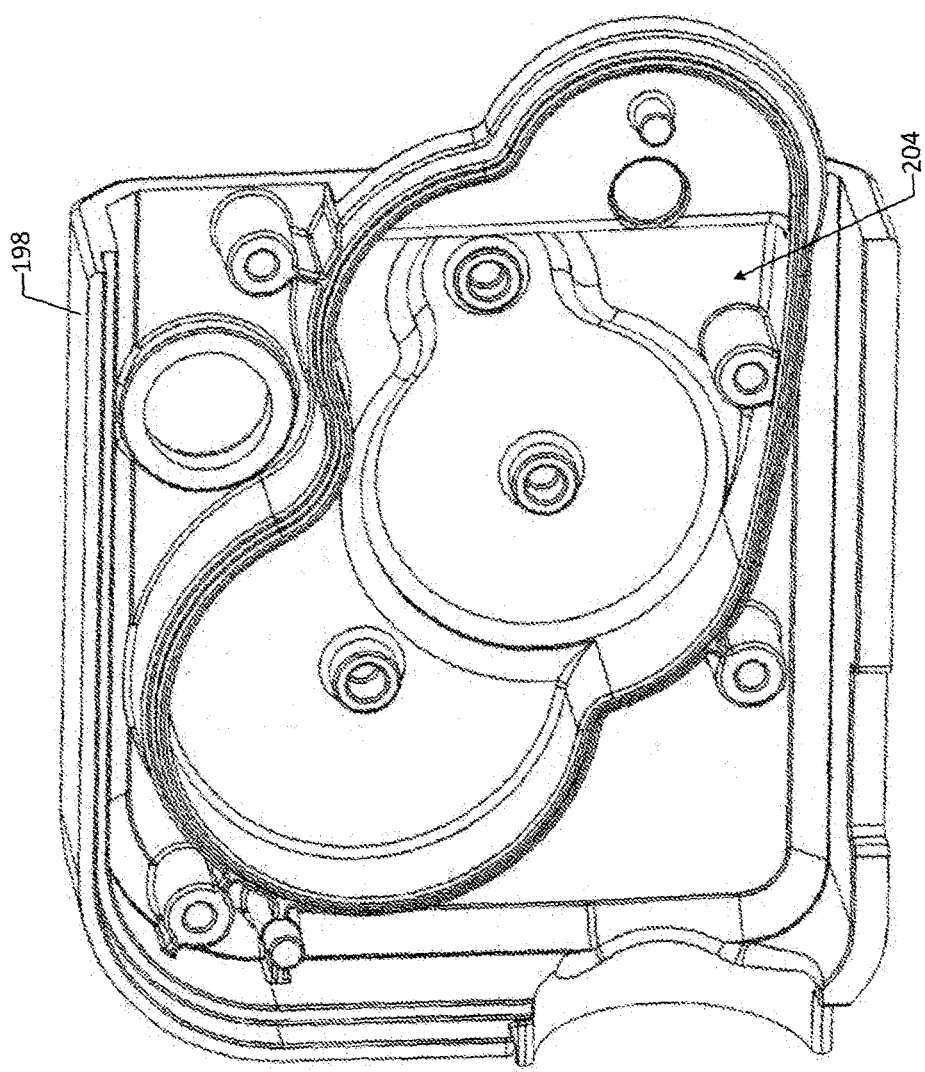
FIG. 1K is a detailed perspective view of the outer portion of the drivetrain housing.
Figure 1L:
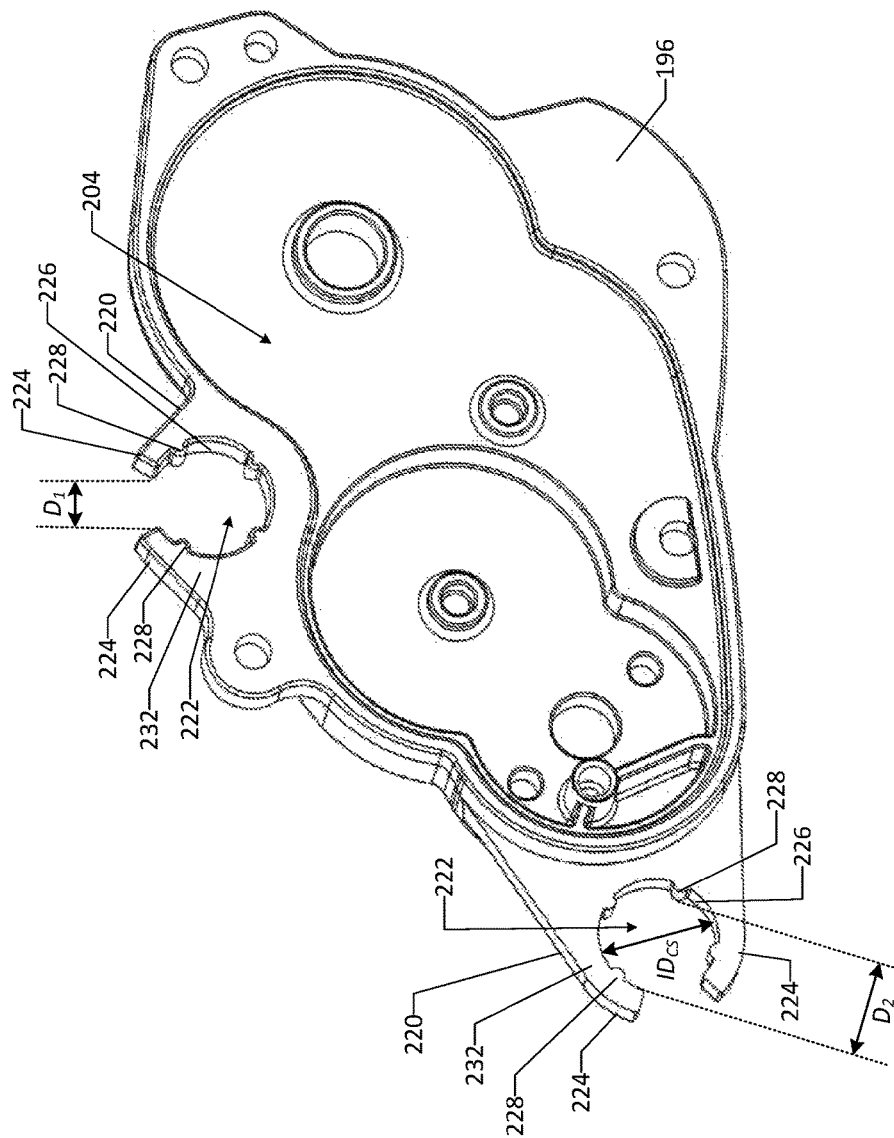
FIG. 1L is a detailed perspective view of the inner portion of the drivetrain housing.

As shown in FIGS. 1B-1D, the drive assembly 118 may be securely mounted to the chassis assembly 114 via the one or more mounting posts 144, the one or more isolation bushings 210, one or more mounting fasteners 242, and one or more mounting washers 244. Each isolation bushing 210 may be disposed over the respective mounting post 144, such that the mounting post 144 extends at least partially through the central opening 212 of the isolation bushing 210. A respective end of the isolation bushing 210 may abut the first side wall 138 of the chassis frame 132. A respective mounting fastener 242 may extend through a respective mounting washer 244 and be threaded into or otherwise attached to the mounting post 144, such as via the central opening of the post 144, to secure the isolation bushing 210 to the mounting post 144. Although the mounting fasteners 242 are shown as screws, other types of fasteners may be used. As shown, the mounting washer 244 may have an outer diameter $OD_{MW}$ that is greater than the inner diameter $ID_{CO}$ of the central opening 212 of the isolation bushing 210, such that the bushing 210 is retained on the mounting post 144 by the washer 244. In some embodiments, the mounting washers 244 are omitted and the mounting fasteners 242 include a head configured to retain the isolation bushings 210 on the mounting posts 144. In such embodiments, the head of each mounting fastener 242 may have an outer diameter that is greater than the inner diameter $ID_{CO}$ of the central opening 212 of the isolation bushing 210, such that the bushing 210 is retained on the mounting post 144 by the fastener 242.

In some embodiments, the length $L_{MP}$ of the mounting post 144 is greater than the length $L_{IB}$ of the isolation bushing 210, such that a tip end of the mounting post 144 protrudes from the central opening 212 of the bushing 210. In this manner, the mounting fastener 242 may be threaded or otherwise advanced into the mounting post 144 until the mounting washer 244 (or the head of the fastener 242, if the washer 244 is omitted) contacts the tip end of the mounting post 144, without compressing the isolation bushing 210 via the washer 244 (or the head of the fastener 242). In other embodiments, the length $L_{MP}$ of the mounting post 144 is less than the length $L_{IB}$ of the isolation bushing 210, such that the tip end of the mounting post 144 is disposed within the central opening 212 of the bushing 210. In this manner, the mounting fastener 242 may be threaded or otherwise advanced into the mounting post 144 until the mounting washer 244 (or the head of the fastener 242, if the washer 244 is omitted) contacts the tip end of the mounting post 144, thereby compressing the isolation bushing 210 via the washer 244 (or the head of the fastener 242). In still other embodiments, the length $L_{MP}$ of the mounting post 144 is equal to the length $L_{IB}$ of the isolation bushing 210, such that the tip end of the mounting post 144 is flush with the respective end of the bushing 210. In this manner, the mounting fastener 242 may be threaded or otherwise advanced into the mounting post 144 until the mounting washer 244 (or the head of the fastener 242, if the washer 244 is omitted) contacts the tip end of the mounting post 144, without significantly compressing the isolation bushing 210 via the washer 244 (or the head of the fastener 242).

As shown, the drive assembly 118 may be mounted to the chassis assembly 114 such that the motor 172 is disposed within the motor opening 146 of the chassis frame 132. The motor 172 may be disposed within the motor opening 146 such that the motor 172 is entirely spaced apart from the chassis frame 132. In other words, the motor 172 may be disposed within the motor opening 146 such that no portion of the motor 172 directly contacts any portion of the chassis frame 132. The motor 172 may be connected to a power supply, which may include one or more batteries, via wires extending between the wire connectors 180 and the power supply. In some embodiments, the power supply is supported by the chassis frame 132.

In some embodiments, as shown, the drive assembly 118 (i.e., the motor 172, the drivetrain 174, and the drivetrain housing 174) is mounted to the chassis assembly 114, via the mounting posts 144, the isolation bushings 210, the mounting fasteners 242, and the mounting washers 244, such that the drive assembly 118 is entirely spaced apart from the chassis frame 132. In other words, the drive assembly 118 may be mounted to the chassis assembly 114 such that no portion of the drive assembly 118 directly contacts any portion of the chassis frame 132. According to the illustrated embodiment, the drive assembly 118 directly contacts only the isolation bushings 210, which directly contact the chassis assembly 114 as described above, and the drive roller shaft 158. In some embodiments, as shown, the drive assembly 118 is mounted to the chassis assembly 114 such that the drive assembly 118 is entirely spaced apart from the chassis assembly 114 except for the drive roller shaft 158. In other words, the drive assembly 118 may be mounted to the chassis assembly 114 such that no portion of the drive assembly 118 except for the drive roller gear 192 directly contacts any portion of the chassis assembly 114. In some embodiments, as shown, the drive assembly 118 is mounted to the chassis assembly 114 such that the drive assembly 118 is entirely spaced apart from the dispenser housing 110. In other words, the drive assembly 118 may be mounted to the chassis assembly 114 such that no portion of the drive assembly 118 directly contacts any portion of the dispenser housing 110.

The automated sheet product dispenser 100 described herein advantageously isolates the drive assembly 118 and inhibits transmission of vibrations generated by the motor 172 and the drivetrain 174 to other components of the dispenser 100, such as components of the chassis assembly 114 and the dispenser housing 110. In particular, the mounting arrangement of the drive assembly 118 to the chassis assembly 114, via the isolation bushings 210, inhibits such vibration transmission, thereby limiting sound power levels emitted during operation of the automated sheet product dispenser 100.

Certain aspects of the mounting arrangement of the drive assembly 118 to the chassis assembly 114 may be selected to minimize the transmissibility of the mounting arrangement and thereby maximize the vibration isolation of the drive assembly 118, according to the following relationship: isolation=1−transmissibility. As will be understood, the transmissibility of the mounting arrangement is a function of the forcing frequency and the natural frequency of the isolation bushings 210, according to the following relationship: transmissibility=|1/(1−(forcing frequency/natural frequency)$^2$)|. The natural frequency of the isolation bushings 210 generally is affected by the durometer of the material of the bushings 210 as well as the geometry of the bushings 210 and the components that contact the bushings 210 (i.e., the mounting posts 144 and the bushing supports 220). In this manner, use of a lower durometer material for the isolation bushings 210 may result in a lower natural frequency of the bushings 210. Additionally, as described above, the protrusions 228 of the bushing supports 220 and/or the isolation bushings 210 may cause portions of the bushings 210 to deflect or flex in a manner that lowers the stiffness of the bushings 210 and thereby results in a lower natural frequency of the bushings 210. Ultimately, the durometer of the material of the bushings 210 and the geometry and arrangement of the protrusions 228 may be selected to result in a relatively low natural frequency of the bushings 210, thereby minimizing the transmissibility of the mounting arrangement and maximizing the vibration isolation of the drive assembly 118. In some embodiments, the natural frequency of the mounting arrangement is less than 20 Hz. In some embodiments, the transmissibility of the mounting arrangement is less than 50% (i.e., less than 0.5) and the vibration isolation of the drive assembly 118 is greater than 50% (i.e., greater than 0.5).

FIGS. 2A-2J illustrate an automated flowable material dispenser 300 (which also may be referred to herein as an "automated product dispenser," a "flowable material dispenser," or a "dispenser") according to one or more embodiments of the disclosure. The dispenser 300 is configured to dispense flowable material from a supply of flowable material 302 supported thereby. The supply of flowable material 302 may be provided in a flowable material housing or container 304 for storing the flowable material prior to dispensing from the dispenser 300. According to various embodiments, the flowable material housing 304 may be a flexible bag, a flexible pouch, or a rigid container configured to house the supply of flowable material 302 therein. In some embodiments, the housing 304 is a rigid container that is collapsible from an expanded configuration to a collapsed configuration. In other embodiments, the housing 304 is a rigid container that is not readily collapsible from its original shape. In some embodiments, the housing 304 is disposable and is replaced each time the dispenser 300 is loaded with a new supply of flowable material 302. In other embodiments, the housing 304 is reusable and is refilled with flowable material each time the dispenser 300 is loaded with a new supply of flowable material 302. As described in detail below, the dispenser 300 is configured to limit sound power levels emitted by the dispenser 300 during dispensing of the flowable material.

The flowable material dispensed by the automatic flowable material dispenser 300 may be liquid, gel, or foam soap, liquid, gel, or foam detergent, liquid, gel, or foam lotion, sanitizer liquid, gel, or foam, antimicrobial liquid, gel, or foam, or other types of flowable materials, according to various embodiments. In some embodiments, the flowable material is stored in the flowable material housing 304 and dispensed from the dispenser 300 in the same form. For example, the flowable material may be stored in the housing 304 as a liquid and dispensed from the dispenser 300 as a liquid. In other embodiments, the flowable material is stored in the flowable material housing 304 in a first form and dispensed from the dispenser 300 in a second form. For example, the flowable material may be stored in the housing 304 as a liquid and dispensed from the dispenser 300 as a foam.

Figure 2A:
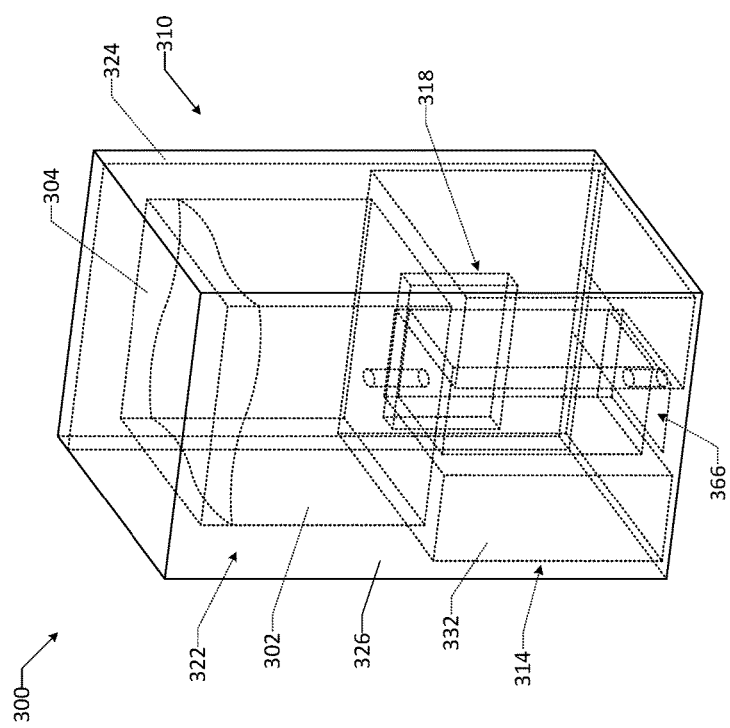
FIG. 2A is a perspective view of an automated flowable material dispenser in accordance with one or more embodiments of the disclosure, showing a dispenser housing, a chassis assembly, and a drive assembly of the dispenser, with a cover of the dispenser housing in a closed position.
Figure 2B:
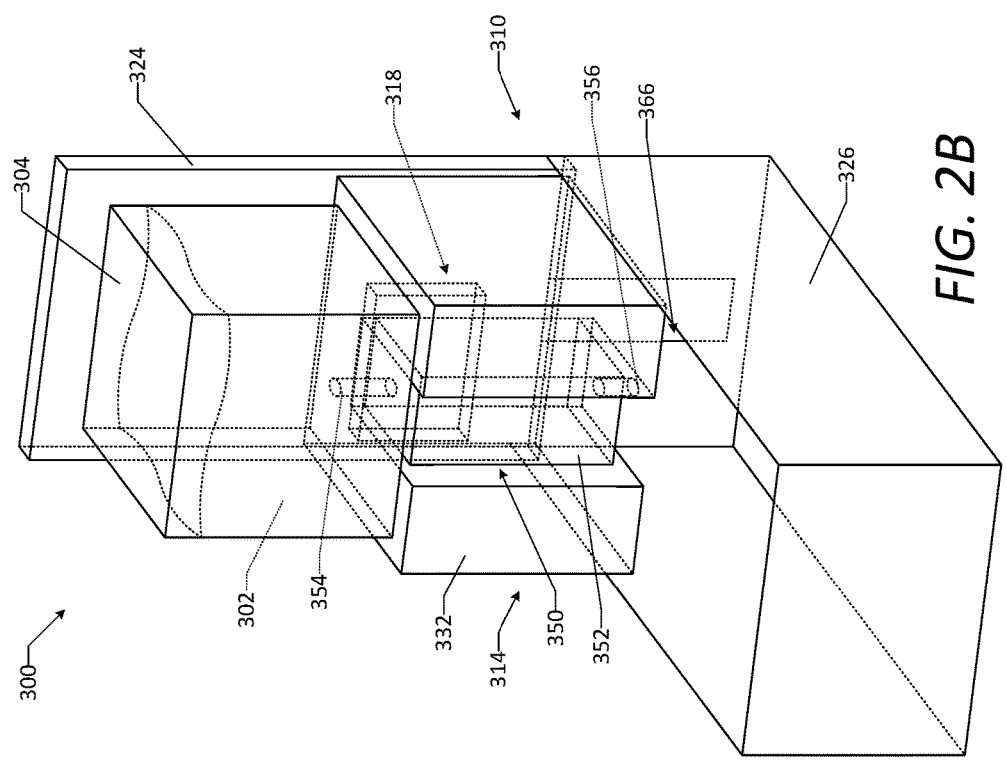
FIG. 2B is a perspective view of the automated flowable material dispenser of FIG. 2A, showing the dispenser housing, the chassis assembly, and the drive assembly of the dispenser, with the cover of the dispenser housing in an open position.
Figure 2C:
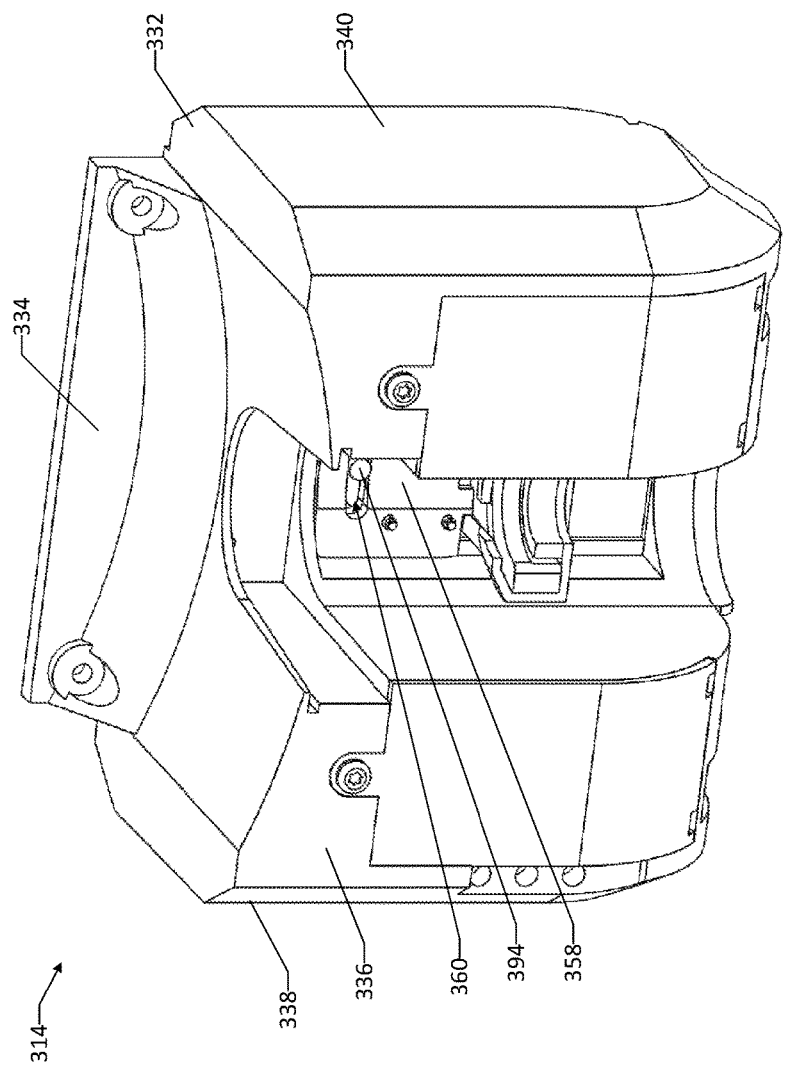
FIG. 2C is a detailed perspective view of a portion of the chassis assembly of the automated flowable material dispenser of FIG. 2A, showing a chassis frame and an actuator plate of the chassis assembly.

As shown, the automated flowable material dispenser 300 may include a dispenser housing 310, a chassis assembly 314, and a drive assembly 318. During use of the dispenser 300, the flowable material housing 304 may be disposed at least partially within the dispenser housing 310 for dispensing flowable material therefrom. In some embodiments, as shown, the dispenser housing 310 is configured to enclose the flowable material housing 304, such that the flowable material housing 304 is disposed entirely within the dispenser housing 310. The dispenser housing 310 may include a plurality of walls defining an interior space 322 inward of the walls and configured to receive the flowable material housing 304 therein. As shown, the dispenser housing 310 may include a base 324 (which also may be referred to herein as a "first dispenser housing portion") and a cover 326 (which also may be referred to herein as a "second dispenser housing portion"). In some embodiments, the base 324 is configured to attach to a wall or other support surface for mounting the dispenser 300 thereto. For example, a back wall of the base 324 may be attached to a vertical wall, a bottom wall of the base 324 may be attached to a countertop surface, or a top wall of the base 324 may be attached to an under-counter surface. The cover 326 may be movably connected to the base 324 and configured to move between a closed position for dispensing flowable material, as shown in FIG. 2A, and an open position for placing the flowable material housing 304 within the interior space 322 of the dispenser 300, as shown in FIG. 2B. For example, as shown, the cover 326 may be pivotably connected to the base 324, such as via one or more hinges. Alternatively, the cover 326 may be slidably connected to the base 324, such as via one or more rails.

The chassis assembly 314 may be disposed at least partially within the dispenser housing 310. In some embodiments, a portion of the chassis assembly 314 is disposed within the dispenser housing 310, while another portion of the chassis assembly 314 is disposed outside of the dispenser housing 310. In other embodiments, the chassis assembly 314 is disposed entirely within the dispenser housing 310. Alternatively, the chassis assembly 314 may be disposed entirely outside of but adjacent to and in communication with the dispenser housing 310. For example, the dispenser housing 310 may be disposed on top of and attached to the chassis assembly 314. In some embodiments, one or more exterior surfaces of the chassis assembly 314 form a portion of the exterior of the dispenser 300. In some embodiments, one or more interior surfaces of the chassis assembly 314, in conjunction with one or more interior surfaces of the walls of the dispenser housing 310, define the interior space 322 of the dispenser 300. In some embodiments, the dispenser 300 does not include a dispenser housing 310 at all, such that the flowable material housing 304 is exposed atop the chassis assembly 314. In some embodiments, the chassis assembly 314 is configured to attach to a wall or other support surface for mounting the dispenser 300 thereto. For example, a back wall of the chassis assembly 314 may be attached to a vertical wall, a bottom wall of the chassis assembly 314 may be attached to a countertop surface, or a top wall of the chassis assembly 314 may be attached to an under-counter surface.

The drive assembly 318 may be mounted to the chassis assembly 314, as shown in FIGS. 2A-2E. Details of the mounting arrangement are described herein below. In some embodiments, as shown, the drive assembly 318 is disposed entirely within the dispenser housing 310. In other embodiments, a portion of the drive assembly 318 is disposed within the dispenser housing 310, while another portion of the drive assembly 318 is disposed outside of the dispenser housing 310. Alternatively, the drive assembly 318 may be disposed entirely outside of the dispenser housing 310. In some embodiments, one or more exterior surfaces of the drive assembly 318 form a portion of the exterior of the dispenser 300. In some embodiments, the drive assembly 318 is disposed entirely within the chassis assembly 314. In other embodiments, a portion of the drive assembly 318 is disposed within the chassis assembly 314, while another portion of the drive assembly 318 is disposed outside of the chassis assembly 314. Alternatively, the drive assembly 318 may be disposed entirely outside of the chassis assembly 314. The foregoing embodiments are merely illustrative, as other configurations of the dispenser housing 310, the chassis assembly 314, and the drive assembly 318 are possible.

Details of the chassis assembly 314 are illustrated in FIGS. 2A-2E. As shown, the chassis assembly 314 may include a chassis frame 332, which may be configured to support various other components of the chassis assembly 314 as well as other portions of the dispenser 300. The chassis frame 332 may include a back wall 334, a front wall 336, a first side wall 338, a second side wall 340, and one or more interior walls 342. In some embodiments, the walls 334, 336, 338, 340, 342 of the chassis frame 332 may be integrally formed within one another. In other embodiments, the walls 334, 336, 338, 340, 342 of the chassis frame 332 may be separately formed and attached to one another. The back wall 334 may be configured to attach to the dispenser housing 310, such as the base 324 thereof. Alternatively, the back wall 334 may be configured to attach to a wall or other support surface for mounting the dispenser 300 thereto. One or more of the walls 334, 336, 338, 340, 342 of the chassis frame 332 may be configured to support a control panel, which may include one or more controllers, sensors, indicators, switches, and/or buttons for controlling operation of the dispenser 300. One or more of the walls 334, 336, 338, 340, 342 of the chassis frame 332 may be configured to support the dispenser housing 310. One or more of the walls 334, 336, 338, 340, 342 of the chassis frame 332 may be configured to support the drive assembly 318. For example, one or more of the interior walls 342 may be configured to support the drive assembly 318.

As shown, the chassis frame 332 may include one or more mounting posts 344 extending outwardly from one or more of the interior walls 342 and configured to allow the drive assembly 318 to be mounted thereto. Although a pair of mounting posts 344 is shown in the illustrated embodiment, any number of mounting posts 344 may be used. In some embodiments, the mounting posts 344 are integrally formed with the interior walls 342. In other embodiments, the mounting posts 344 are formed separately from and attached to the interior walls 342. As shown, each mounting post 344 may include one or more wings 346 extending from the respective interior wall 342 along a proximal or base portion of the post 344. The wings 346 may terminate prior to a distal or tip portion of the mounting post 344. As shown, the tip portion of each mounting post 344 may have an outer diameter $OD_{MP}$ and a length $L_{MP}$. In some embodiments, each mounting post 344 is generally tubular in shape, defining a central opening extending along a longitudinal axis of the post 344. According to other embodiments, the mounting posts 344 may have other shapes configured to mate with an isolation bushing as described below. The central opening may be configured to receive a portion of a fastener therein. For example, the central opening of the mounting post 344 may be threaded to receive a mating threaded fastener, such as a screw or a bolt. The chassis frame 332 also may include a motor opening 348 configured to receive a motor of the drive assembly 318 therein. Details of the mounting arrangement between the drive assembly 318 and the chassis assembly 314 are described herein below.

The chassis assembly 314 also may include a pump assembly 350 supported by the chassis frame 332 and configured to dispense the flowable material from the flowable material housing 304. As shown, the pump assembly 350 may include a pump 352 having an inlet nozzle 354 and an outlet nozzle 356. The inlet nozzle 354 may be in communication with the flowable material housing 304 and configured to receive the flowable material therefrom. The outlet nozzle 356 may be configured to deliver the flowable material out of the pump 352. The pump assembly 350 also may include an actuator plate 358 movably supported by the chassis frame 332. For example, the actuator plate 358 may be configured to translate up and down, relative to the chassis frame 332, between a first position and a second position. The actuator plate 358 may engage a portion of the pump 352, such as a flange or a protrusion thereof, and may be configured to actuate the pump 352 (i.e., cause the pump 352 to dispense the flowable material) when the actuator plate 358 moves from the first position to the second position. In particular, when the actuator plate 358 moves from the first position to the second position, the actuator plate 358 may move the engaged portion of the pump 352 therewith from a first position to a second position, thereby actuating the pump 352. Alternatively, the actuator plate 358 may engage an intermediate component that engages a portion of the pump 352 and moves along with the actuator plate 358, thereby actuating the pump 352. As shown, the actuator plate 358 may include an opening 360 defined therein. The foregoing embodiments are merely illustrative, as other configurations of the chassis assembly 314 are possible.

Upon actuation of the pump 352, the flowable material may be dispensed, via the outlet nozzle 356, through a dispensing opening 366 of the dispenser 300. In some embodiments, as shown, the dispensing opening 366 is defined in the cover 326 of the dispenser housing 310. For example, the dispensing opening 366 may be defined in the bottom wall of the cover 326. In other embodiments, the dispensing opening 366 is defined in the base 324 of the dispenser housing 310, for example, in the bottom wall thereof. In still other embodiments, the dispensing opening 366 is defined in the chassis frame 332, for example, in the bottom wall thereof.

Details of the drive assembly 318 are illustrated in FIGS. 2D-2G. As shown, the drive assembly 318 may include a motor 372, a drivetrain 374, and a drivetrain housing 376. The motor 372 may be an electric motor formed in a conventional manner and including a pair of wire connectors 380 and a motor output shaft 382. The drivetrain 374 may include a plurality of gears configured to be driven by the motor 372 and to move (e.g., translate) the actuator plate 358. According to the illustrated embodiment, the drivetrain 374 may include a motor drive gear 386 (which also may be referred to herein as an "input gear"), a first intermediate gear 388, a second intermediate gear 390, and an actuator gear 392 (which also may be referred to herein as an "output gear"). As shown, the motor drive gear 386 and the actuator gear 392 may be single-step gears, and the first intermediate gear 388 and the second intermediate gear 390 may be two-step gears. The motor output shaft 382 may be coupled to and drive the motor drive gear 386. The motor drive gear 386 may engage and drive the first intermediate gear 388. The first intermediate gear 388 may engage and drive the second intermediate gear 390. The second intermediate gear 390 may engage and drive the actuator gear 392. The actuator gear 392 may engage and move the actuator plate 358. For example, a protrusion 394 of the actuator gear 392 may be disposed within the opening 360 of the actuator plate 358, as shown, and may move the actuator plate 358 upon rotation of the actuator gear 392. In this manner, operation of the motor 372 (i.e., rotation of the motor output shaft 382) may cause the drivetrain 374 to move the actuator plate 358 for actuating the pump 352 to dispense flowable material out of the dispenser 300.

The drivetrain housing 376 may enclose and support the drivetrain 374 therein. As shown, the drivetrain housing 376 may include an inner portion 396 (which also may be referred to herein as a "first drivetrain housing portion" or a "first portion") and an outer portion 398 (which also may be referred to herein as a "second drivetrain housing portion" or a "second portion"). The inner portion 396 and the outer portion 398 may be attached to one another via one or more housing fasteners 402. Although the housing fasteners 402 are shown as screws, other types of fasteners may be used. The inner portion 396 and the outer portion 398 of the drivetrain housing 376 may define an interior space 404 for receiving the drivetrain 374 therein. Interior surfaces of the inner portion 396 and the outer portion 398 may be configured to receive and maintain the gears 386, 388, 390, 392 of the drivetrain 374 in a desired relationship for operation thereof. The motor 372 may be attached to and supported by the inner portion 396 of the drivetrain housing 376. In particular, as shown in FIG. 2G, the motor output shaft 382 may extend into the interior space 404 of the drivetrain housing 376 and the motor 372 may be attached to the inner portion 396 via one or more motor fasteners 406. Although the motor fasteners 406 are shown as screws, other types of fasteners may be used. The foregoing embodiments are merely illustrative, as other configurations of the drive assembly 318 are possible. The drive assembly 318 and the pump assembly 350 may be considered part of an automated dispensing mechanism of the automated flowable material dispenser 300.

As described above, the drive assembly 318 may be mounted to the chassis assembly 314. In particular, the drive assembly 318 may be mounted to the chassis assembly 314 via one or more isolation bushings 410 (which also may be referred to herein as "isolation grommets," "isolation mounts," or "isolation members"), as shown. Although a pair of isolation bushings 410 is shown in the illustrated embodiment, any number of isolation bushings 410 may be used. One of the isolation bushings 410 is illustrated in detail in FIGS. 2H-2J. As shown, the isolation bushing 410 may have a generally tubular (annular) shape and a circular cross-sectional shape, although other shapes may be used, for example, to optimize the stiffness of the isolation bushing 410. The isolation bushing 410 may include a central opening 412 extending therethrough along a longitudinal axis of the bushing 410. The central opening 412 may have an inner diameter $ID_{CO}$. As shown, the isolation bushing 410 may include a central body portion 414, a first flange 416 disposed at a first end of the bushing 410, and a second flange 418 disposed at a second end of the bushing 410. The central body portion 414 may have an outer diameter $OD_{CB}$, and the flanges 416, 418 may have an outer diameter $OD_F$ greater than the outer diameter $OD_{CB}$ of the central body portion 414. The central body portion 414 may have a length $L_{CB}$, and the isolation bushing 410 may have an overall length $L_{IB}$. The isolation bushing 410 may be formed of an elastomeric material, such as a polyurethane, silicone, thermoplastic elastomer, or natural or synthetic rubber, although other suitable materials may be used. In some embodiments, the isolation bushing 410 is formed of a material having a relatively low durometer. The foregoing embodiments are merely illustrative, as other configurations of the isolation bushing 410 are possible.

As shown, the drive assembly 318 may include one or more bushing supports 420 (which also may be referred to herein as "grommet supports" or "mount supports") configured to receive and support the one or more isolation bushings 410. In some embodiments, as shown in FIGS. 2D-2G, the bushing supports 420 are part of the outer portion 398 of the drivetrain housing 376 or integrally formed therewith. In other embodiments, the bushing supports 420 are part of the inner portion 396 of the drivetrain housing 376 or integrally formed therewith. In still other embodiments, the bushing supports 420 may be formed separately from and attached to either the inner portion 396 or the outer portion 398 of the drivetrain housing 376. According to the illustrated embodiment, the bushing supports 420 are disposed along a periphery of the outer portion 398. Although a pair of bushing supports 420 is shown, any number of bushing supports 420 may be used to correspond to the number of isolation bushings 410 used.

Figure 2D:
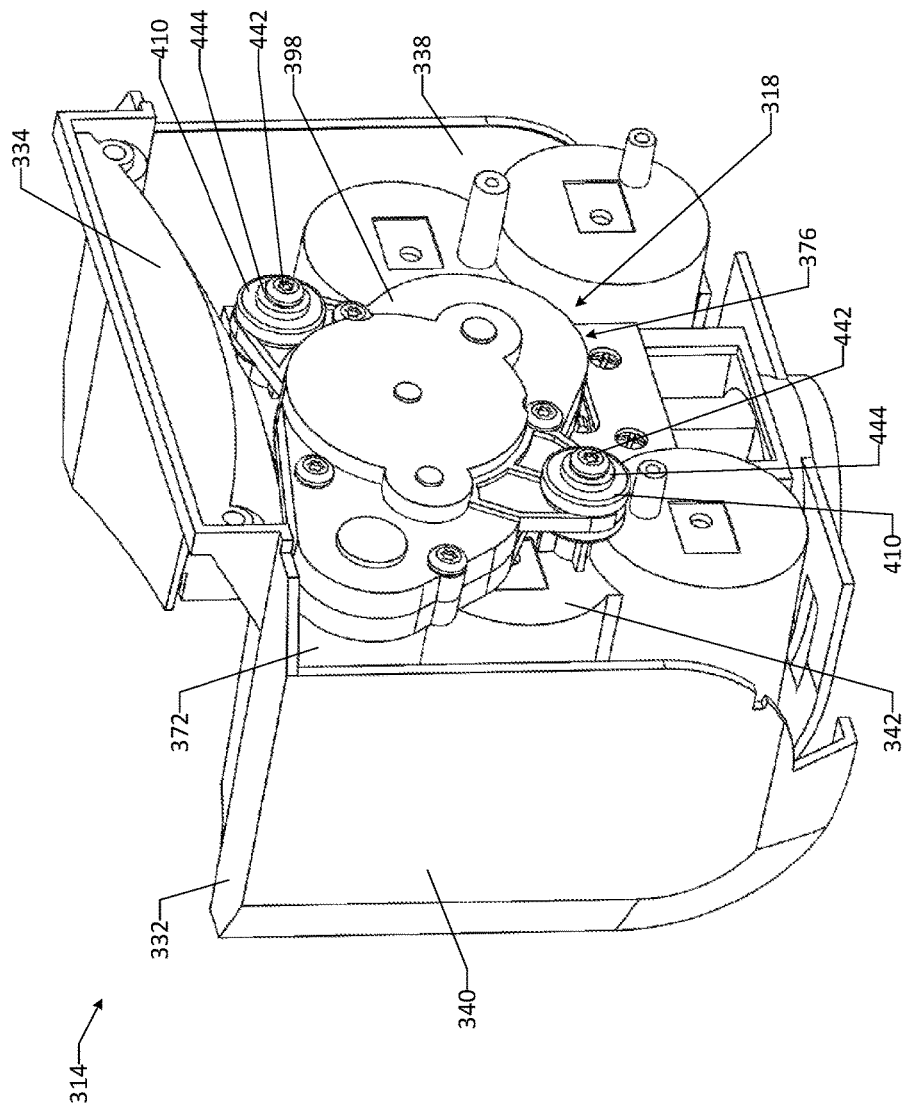
FIG. 2D is a detailed perspective view of a portion of the chassis assembly, the drive assembly, isolation bushings, mounting fasteners, and mounting washers of the automated flowable material dispenser of FIG. 2A.
Figure 2E:
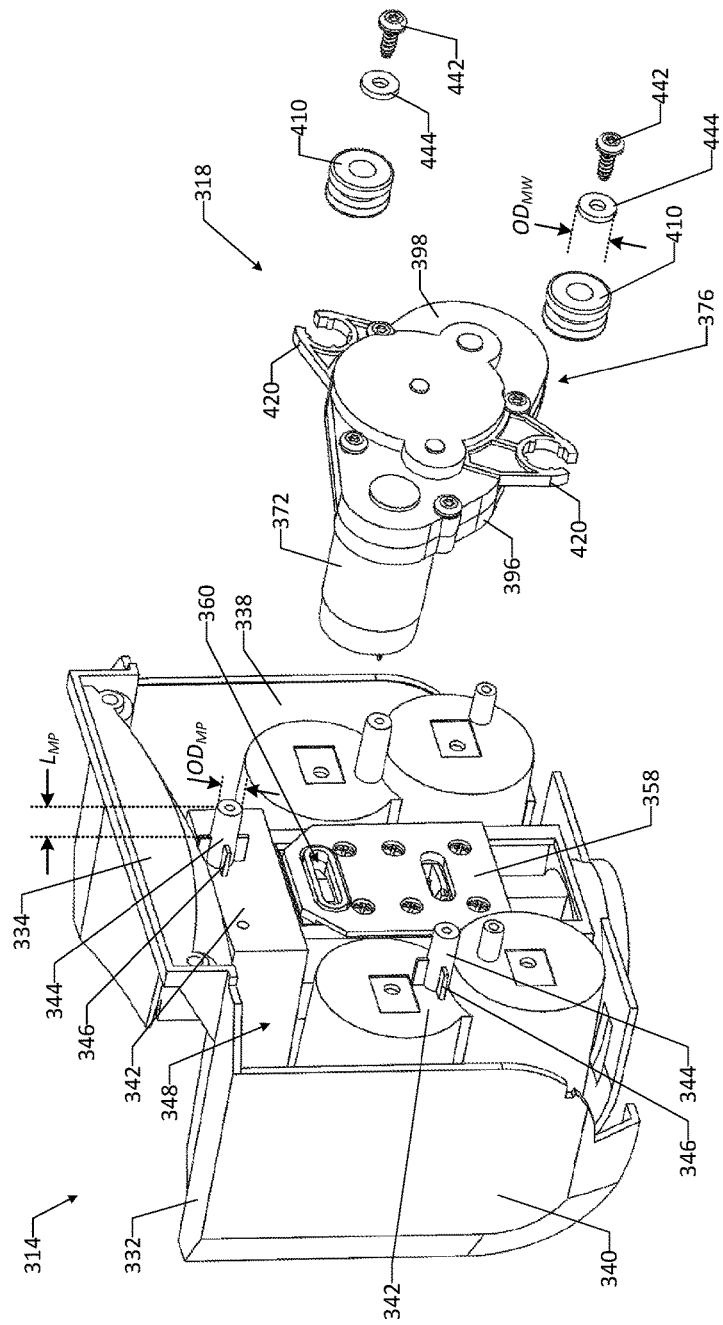
FIG. 2E is a detailed exploded perspective view of a portion of the chassis assembly, the drive assembly, the isolation bushings, the mounting fasteners, and the mounting washers.
Figure 2F:
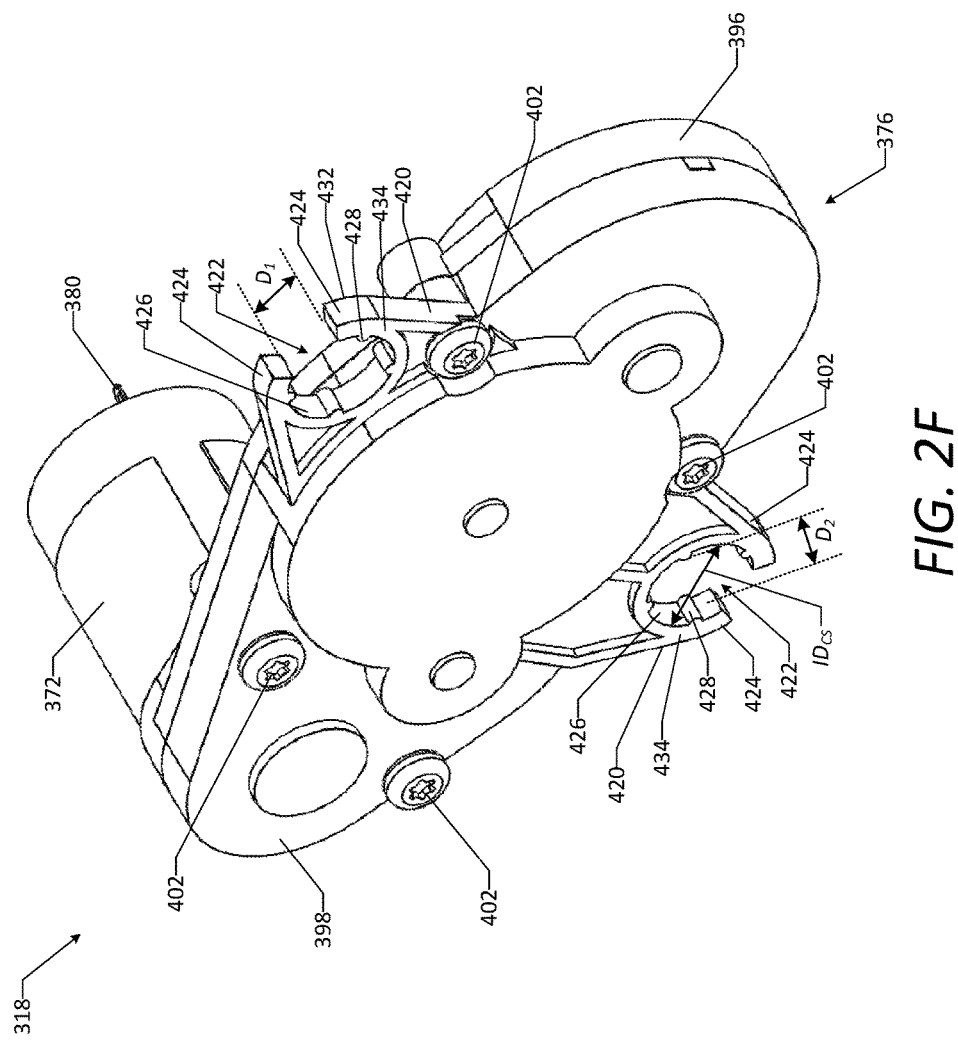
FIG. 2F is a detailed perspective view of the drive assembly, showing a motor, a drivetrain housing, and housing fasteners of the drive assembly.
Figure 2H:
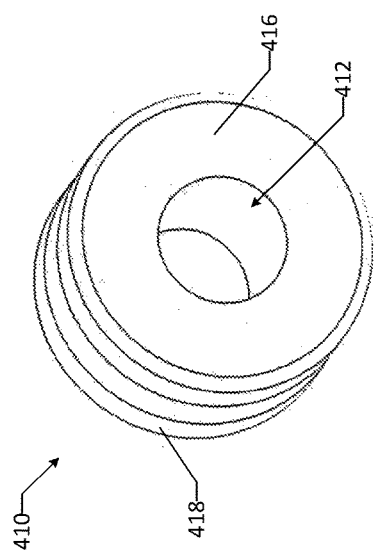
FIG. 2H is a detailed perspective view of the isolation bushing.
Figure 2J:
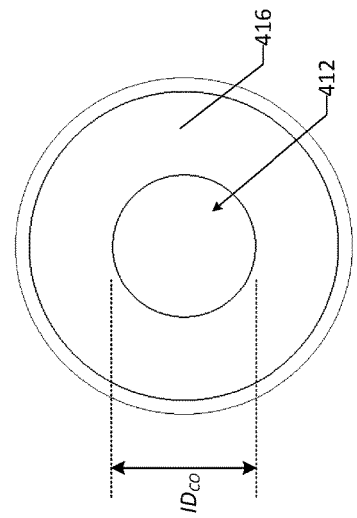
FIG. 2J is a detailed end view of the isolation bushing.
Figure 2I:
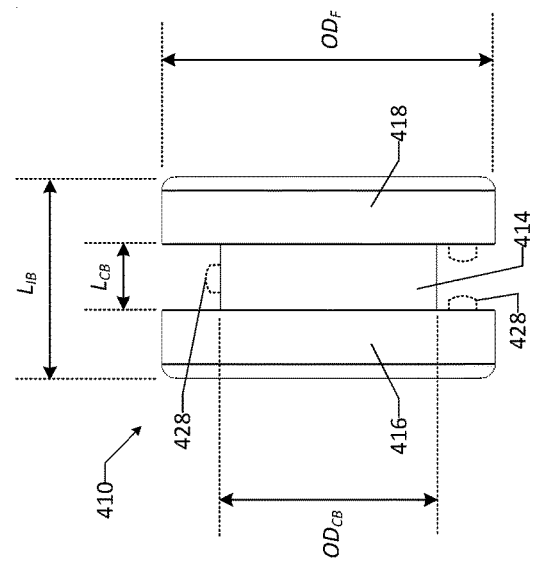
FIG. 2I is a detailed side view of the isolation bushing.

As shown in FIGS. 2F and 2G, each bushing support 420 may define a bushing opening 422 configured to receive a portion of the corresponding isolation bushing 410 therein. In some embodiments, as shown, the bushing support 420 includes a pair of arms 424 defining at least a portion of the bushing opening 422 therebetween. The arms 424 may be oriented and shaped such that the bushing support 420 has a generally C-shaped profile. In some embodiments, as shown, a distance $D_1$ between tips of the arms 424 may be less than the outer diameter $OD_{CB}$ of the central body portion 414 of the isolation bushing 410. In this manner, the isolation bushing 410 may be inserted into the bushing opening 422 and retained therein by the arms 424. Alternatively, the arms 424 may be oriented and shaped such that the bushing support 420 has a generally U-shaped profile. The bushing opening 422 may be defined by a contact surface 426 of the bushing support 420 configured to contact a portion of the isolation bushing 410, such as the central body portion 414. As shown, the contact surface 426 may have a generally partial-circle-shaped profile. In some embodiments, an inner diameter $ID_{CS}$ of the profile of the contact surface 426 is less than the outer diameter $OD_{CB}$ of the central body portion 414 of the isolation bushing 410, such that the bushing support 420 slightly compresses or deflects the central body portion 414. In other embodiments, the inner diameter $ID_{CS}$ of the profile of the contact surface 426 is equal to or greater than the outer diameter $OD_{CB}$ of the central body portion 414 of the isolation bushing 410.

As shown, the bushing support 420 may include one or more protrusions 428 configured to contact a portion of the isolation bushing 410. In some embodiments, as shown in FIGS. 2F and 2G, the bushing support 420 includes a plurality of the protrusions 428 disposed on the contact surface 426 and configured to contact the central body portion 414 of the bushing 410. The protrusions 428 may be formed as ridges, as shown, although other shapes of the protrusions 428, such as pins or partial spheres, may be used. In some embodiments, a distance $D_2$ between a tip of one of the protrusions and an opposing portion of the contact surface 426 is less than the outer diameter $OD_{CB}$ of the central body portion 414 of the isolation bushing 410, such that the bushing support 420 slightly compresses or deflects the central body portion 414. In some embodiments, the bushing support 420 alternatively or additionally includes one or more of the protrusions 428 disposed on an inner surface 432 or an outer surface 434 of the bushing support 420 and configured to contact the respective flange 416, 418 of the isolation bushing 410. In some such embodiments, a distance between a tip of one of the protrusions 428 and the opposite surface of the bushing support 420 (i.e., the inner surface 432 or the outer surface 434) is greater than the length $L_{CB}$ of the central body portion 414 (i.e., the distance between the flanges 416, 418), such that the bushing support 420 slightly deflects one or both of the flanges 416, 418. In some embodiments, the isolation bushing 410 includes one or more protrusions 428 (shown via dashed lines in FIG. 2I) configured to contact a portion of the bushing support 420, such that a portion of the bushing 410 is slightly compressed or deflected by the bushing support 420. Such protrusions 428 may be disposed on the central body portion 414, the first flange 416, and/or the second flange 418 of the isolation bushing 410. Ultimately, the protrusions 428 of the bushing support 420 and/or the isolation bushing 410 may be configured to affect the stiffness of the isolation bushing 410 in order to optimize the isolation bushing 410 for isolation of the drive assembly 318, as described below. The foregoing embodiments are merely illustrative, as other configurations of the isolation bushing 410 and the bushing support 420 are possible.

As shown in FIGS. 2D and 2E, the drive assembly 318 may be securely mounted to the chassis assembly 314 via the one or more mounting posts 344, the one or more isolation bushings 410, one or more mounting fasteners 442, and one or more mounting washers 444. Each isolation bushing 410 may be disposed over the tip portion of the respective mounting post 344, such that the mounting post 344 extends at least partially through the central opening 412 of the isolation bushing 410. A respective end of the isolation bushing 410 may abut the one or more wings 346 of the mounting post 344. A respective mounting fastener 442 may extend through a respective mounting washer 444 and be threaded into or otherwise attached to the mounting post 344, such as via the central opening of the post 344, to secure the isolation bushing 410 to the mounting post 344. Although the mounting fasteners 442 are shown as screws, other types of fasteners may be used. As shown, the mounting washer 444 may have an outer diameter $OD_{MW}$ that is greater than the inner diameter $ID_{CO}$ of the central opening 412 of the isolation bushing 410, such that the bushing 410 is retained on the mounting post 344 by the washer 444. In some embodiments, the mounting washers 444 are omitted and the mounting fasteners 442 include a head configured to retain the isolation bushings 410 on the mounting posts 344. In such embodiments, the head of each mounting fastener 442 may have an outer diameter that is greater than the inner diameter $ID_{CO}$ of the central opening 412 of the isolation bushing 410, such that the bushing 410 is retained on the mounting post 344 by the fastener 442.

In some embodiments, the length $L_{MP}$ of the tip portion of the mounting post 344 is greater than the length $L_{IB}$ of the isolation bushing 410, such that a tip end of the mounting post 344 protrudes from the central opening 412 of the bushing 410. In this manner, the mounting fastener 442 may be threaded or otherwise advanced into the mounting post 344 until the mounting washer 444 (or the head of the fastener 442, if the washer 444 is omitted) contacts the tip end of the mounting post 344, without compressing the isolation bushing 410 via the washer 444 (or the head of the fastener 442). In other embodiments, the length $L_{MP}$ of the tip portion of the mounting post 344 is less than the length $L_{IB}$ of the isolation bushing 410, such that the tip of the mounting post 344 is disposed within the central opening 412 of the bushing 410. In this manner, the mounting fastener 442 may be threaded or otherwise advanced into the mounting post 344 until the mounting washer 444 (or the head of the fastener 442, if the washer 444 is omitted) contacts the tip end of the mounting post 344, thereby compressing the isolation bushing 410 via the washer 444 (or the head of the fastener 442). In still other embodiments, the length $L_{MP}$ of the tip portion of the mounting post 344 is equal to the length $L_{IB}$ of the isolation bushing 410, such that the tip end of the mounting post 344 is flush with the respective end of the bushing 410. In this manner, the mounting fastener 442 may be threaded or otherwise advanced into the mounting post 344 until the mounting washer 444 (or the head of the fastener 442, if the washer 444 is omitted) contacts the tip end of the mounting post 344, without significantly compressing the isolation bushing 410 via the washer 444 (or the head of the fastener 442).

As shown, the drive assembly 318 may be mounted to the chassis assembly 314 such that the motor 372 is disposed within the motor opening 348 of the chassis frame 332. The motor 372 may be disposed within the motor opening 348 such that the motor 372 is entirely spaced apart from the chassis frame 332. In other words, the motor 372 may be disposed within the motor opening 348 such that no portion of the motor 372 directly contacts any portion of the chassis frame 332. The motor 372 may be connected to a power supply, which may include one or more batteries, via wires extending between the wire connectors 380 and the power supply. In some embodiments, the power supply is supported by the chassis frame 332.

In some embodiments, as shown, the drive assembly 318 (i.e., the motor 372, the drivetrain 374, and the drivetrain housing 374) is mounted to the chassis assembly 314, via the mounting posts 344, the isolation bushings 410, the mounting fasteners 442, and the mounting washers 444, such that the drive assembly 318 is entirely spaced apart from the chassis frame 332. In other words, the drive assembly 318 may be mounted to the chassis assembly 314 such that no portion of the drive assembly 318 directly contacts any portion of the chassis frame 332. According to the illustrated embodiment, the drive assembly 318 directly contacts only the isolation bushings 410, which directly contact the chassis assembly 314 as described above, and the actuator plate 358. In some embodiments, as shown, the drive assembly 318 is mounted to the chassis assembly 314 such that the drive assembly 318 is entirely spaced apart from the chassis assembly 314 except for the actuator plate 358. In other words, the drive assembly 318 may be mounted to the chassis assembly 314 such that no portion of the drive assembly 318 except for the actuator gear 392 directly contacts any portion of the chassis assembly 314. In some embodiments, as shown, the drive assembly 318 is mounted to the chassis assembly 314 such that the drive assembly 318 is entirely spaced apart from the dispenser housing 310. In other words, the drive assembly 318 may be mounted to the chassis assembly 314 such that no portion of the drive assembly 318 directly contacts any portion of the dispenser housing 310.

The automated flowable material dispenser 300 described herein advantageously isolates the drive assembly 318 and inhibits transmission of vibrations generated by the motor 372 and the drivetrain 374 to other components of the dispenser 300, such as components of the chassis assembly 314 and the dispenser housing 310. In particular, the mounting arrangement of the drive assembly 318 to the chassis assembly 314, via the isolation bushings 410, inhibits such vibration transmission, thereby limiting sound power levels emitted during operation of the automated flowable material dispenser 300.

Certain aspects of the mounting arrangement of the drive assembly 318 to the chassis assembly 314 may be selected to minimize the transmissibility of the mounting arrangement and thereby maximize the vibration isolation of the drive assembly 318, according to the following relationship: isolation=1−transmissibility. As will be understood, the transmissibility of the mounting arrangement is a function of the forcing frequency and the natural frequency of the isolation bushings 410, according to the following relationship: transmissibility=|1/(1−(forcing frequency/natural frequency)$^2$)|. The natural frequency of the isolation bushings 410 generally is affected by the durometer of the material of the bushings 410 as well as the geometry of the bushings 410 and the components that contact the bushings 410 (i.e., the mounting posts 344 and the bushing supports 420). In this manner, use of a lower durometer material for the isolation bushings 410 may result in a lower natural frequency of the bushings 410. Additionally, as described above, the protrusions 428 of the bushing supports 420 and/or the isolation bushings 410 may cause portions of the bushings 410 to deflect or flex in a manner that lowers the stiffness of the bushings 410 and thereby results in a lower natural frequency of the bushings 410. Ultimately, the durometer of the material of the bushings 410 and the geometry and arrangement of the protrusions 428 may be selected to result in a relatively low natural frequency of the bushings 410, thereby minimizing the transmissibility of the mounting arrangement and maximizing the vibration isolation of the drive assembly 318. In some embodiments, the natural frequency of the mounting arrangement is less than 20 Hz. In some embodiments, the transmissibility of the mounting arrangement is less than 50% (i.e., less than 0.5) and the vibration isolation of the drive assembly 318 is greater than 50% (i.e., greater than 0.5).

It will be understood that the automated product dispensers and related methods described above are not limited to automated sheet product dispensers and automated flowable material dispensers. The described mounting arrangement of a drive assembly and a chassis assembly, via one or more isolation bushings, is similarly applicable to other automated product dispensers, such as automated cutlery dispensers, automated air freshener dispensers, and other types of automated product dispensers. In particular, the described mounting arrangement may be used in any type of automated product dispenser to advantageously limit sound power levels emitted during operation of an automated dispensing mechanism including a motor and a drivetrain.

FIGS. 3A-3K illustrate a chassis assembly 514 and a drive assembly 518 according to one or more embodiments of the disclosure. The chassis assembly 514 and the drive assembly 518 may be used, instead of the chassis assembly 114 and the drive assembly 118 described above, along with the dispenser housing 110 to form the automated sheet product dispenser 100. It will be appreciated that the chassis assembly 514 generally may include components and features similar to those of the chassis assembly 114, and that the chassis assembly 514 generally may function in a manner similar to that of the chassis assembly 114, although certain structural and functional differences are described herein below. Additionally, it will be appreciated that the drive assembly 518 generally may include components and features similar to those of the drive assembly 118, and that the drive assembly 518 generally may function in a manner similar to that of the drive assembly 118, although certain structural and functional differences are described herein below. Corresponding components and features are indicated by corresponding reference numbers (i.e., reference numbers beginning with a "5" or a "6" instead of a "1" or a "2") in the description and the figures. As described in detail below, the dispenser 100 including the chassis assembly 514 and the drive assembly 518 is configured to limit sound power levels emitted by the dispenser 100 during dispensing of the sheet product from a roll 102.

The chassis assembly 514 may be disposed at least partially within the dispenser housing 110. In some embodiments, a portion of the chassis assembly 514 is disposed within the housing 110, while another portion of the chassis assembly 514 is disposed outside of the housing 110. In other embodiments, the chassis assembly 514 is disposed entirely within the housing 110. Alternatively, the chassis assembly 514 may be disposed entirely outside of but adjacent to and in communication with the dispenser housing 110. For example, the housing 110 may be disposed on top of and attached to the chassis assembly 514. In some embodiments, one or more exterior surfaces of the chassis assembly 514 form a portion of the exterior of the dispenser 100. In some embodiments, one or more interior surfaces of the chassis assembly 514, in conjunction with one or more interior surfaces of the walls of the housing 110, define the interior space 122 of the dispenser 100. In some embodiments, the dispenser 100 does not include a housing 110 at all, such that the roll 102 of sheet product is exposed atop the chassis assembly 514. In some embodiments, the chassis assembly 514 is configured to attach to a wall or other support surface for mounting the dispenser 100 thereto. For example, a back wall of the chassis assembly 514 may be attached to a vertical wall, a bottom wall of the chassis assembly 514 may be attached to a countertop surface, or a top wall of the chassis assembly 514 may be attached to an under-counter surface.

Figure 3A:
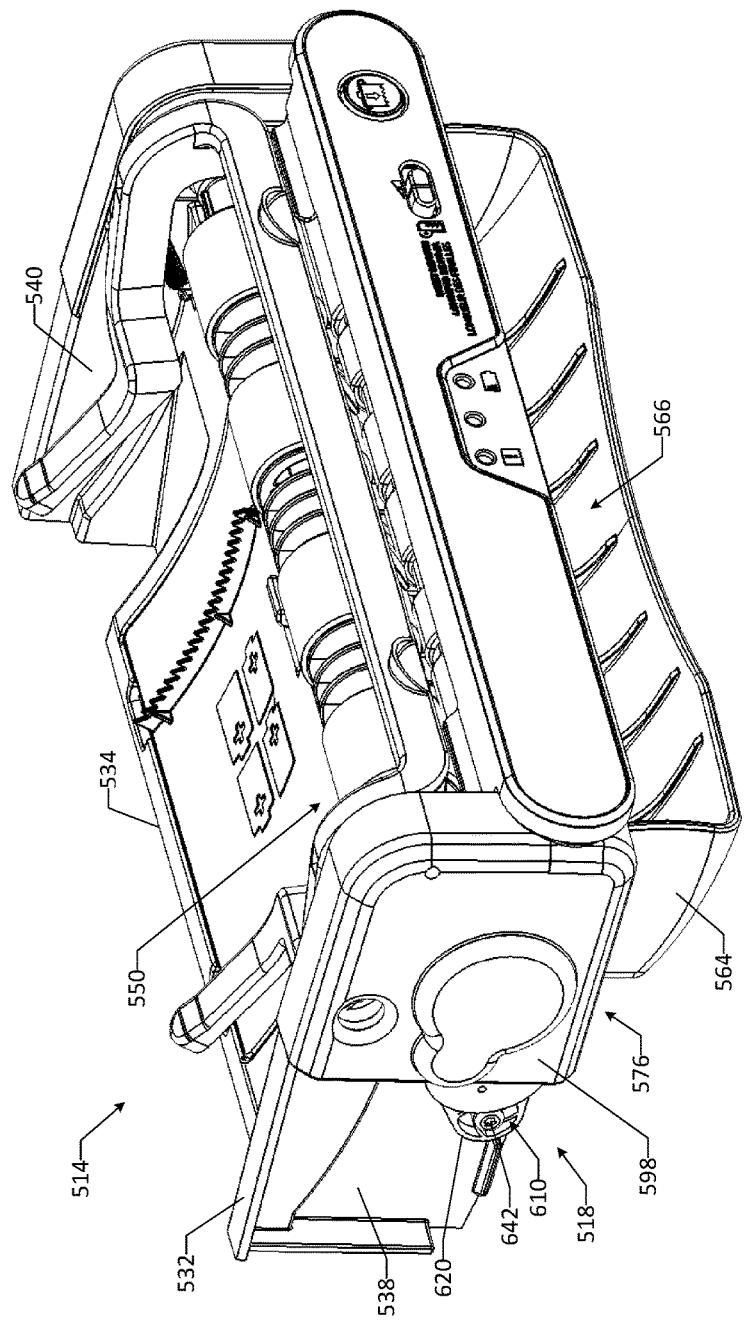
FIG. 3A is a perspective view of a chassis assembly and a drive assembly of an automated sheet product dispenser in accordance with one or more embodiments of the disclosure.
Figure 3B:
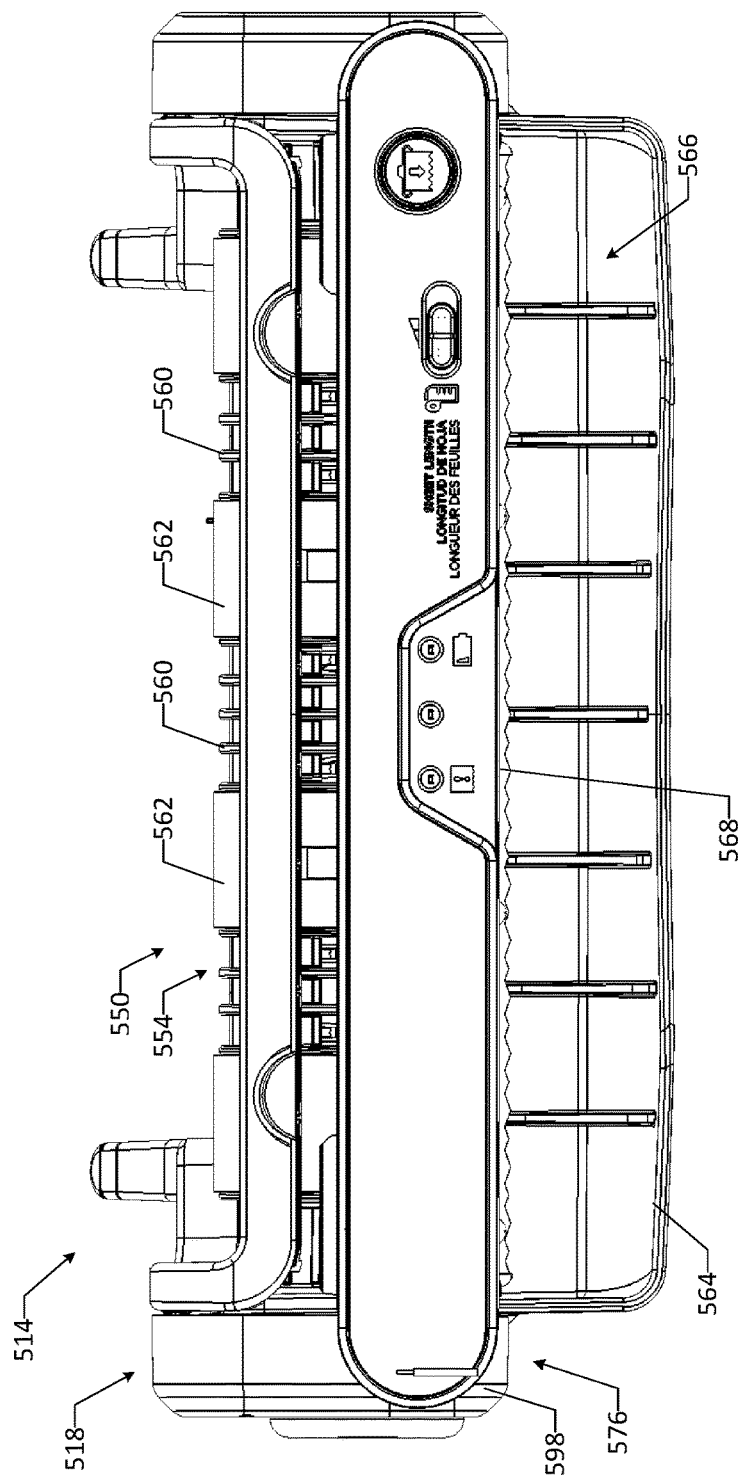
FIG. 3B is a detailed front view of the chassis assembly and the drive assembly of the automated sheet product dispenser of FIG. 3A.
Figure 3C:
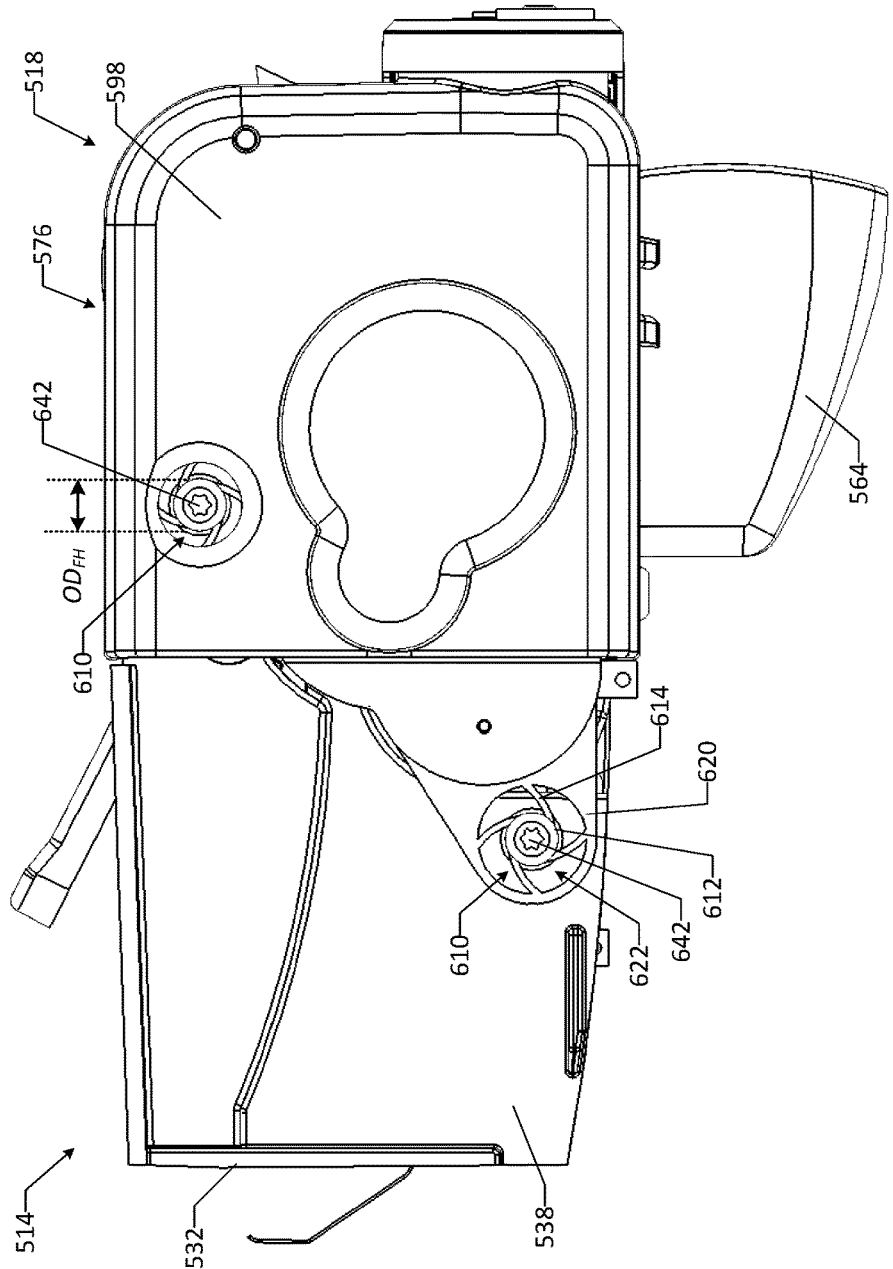
FIG. 3C is a detailed side view of the chassis assembly, the drive assembly, and mounting fasteners of the automated sheet product dispenser of FIG. 3A.
Figure 3D:
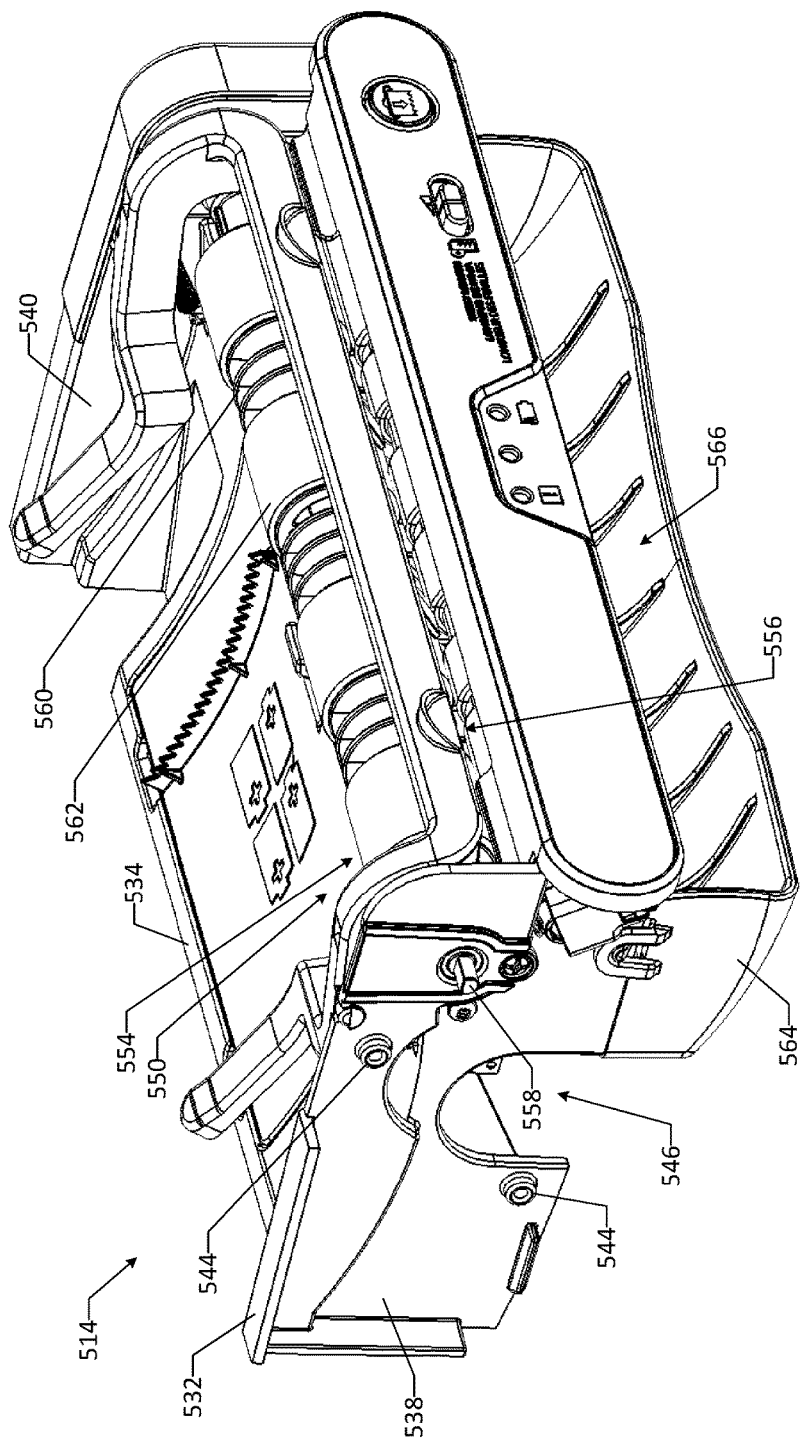
FIG. 3D is a detailed perspective view of the chassis assembly, showing a chassis frame, a roller assembly, and a dispensing chute of the chassis assembly.
Figure 3E:
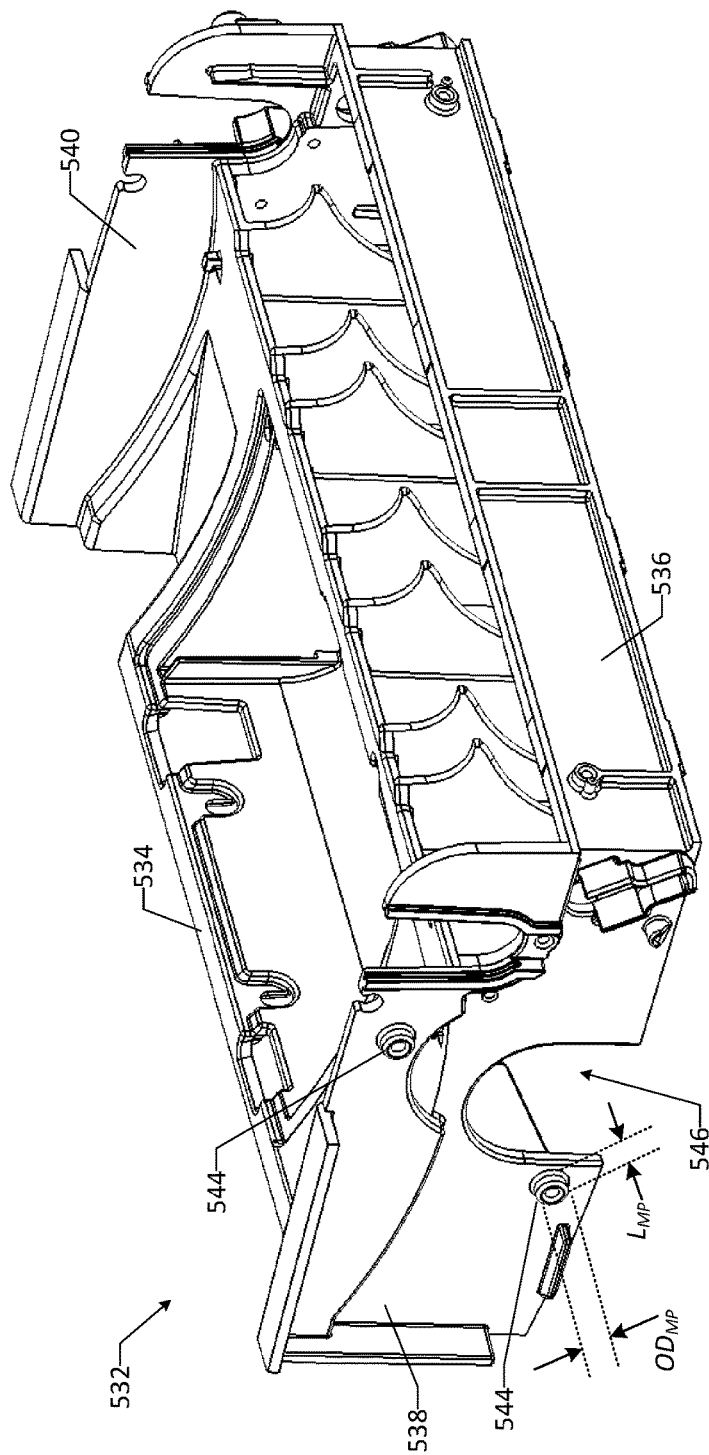
FIG. 3E is a detailed perspective view of the chassis frame of the chassis assembly.
Figure 3F:
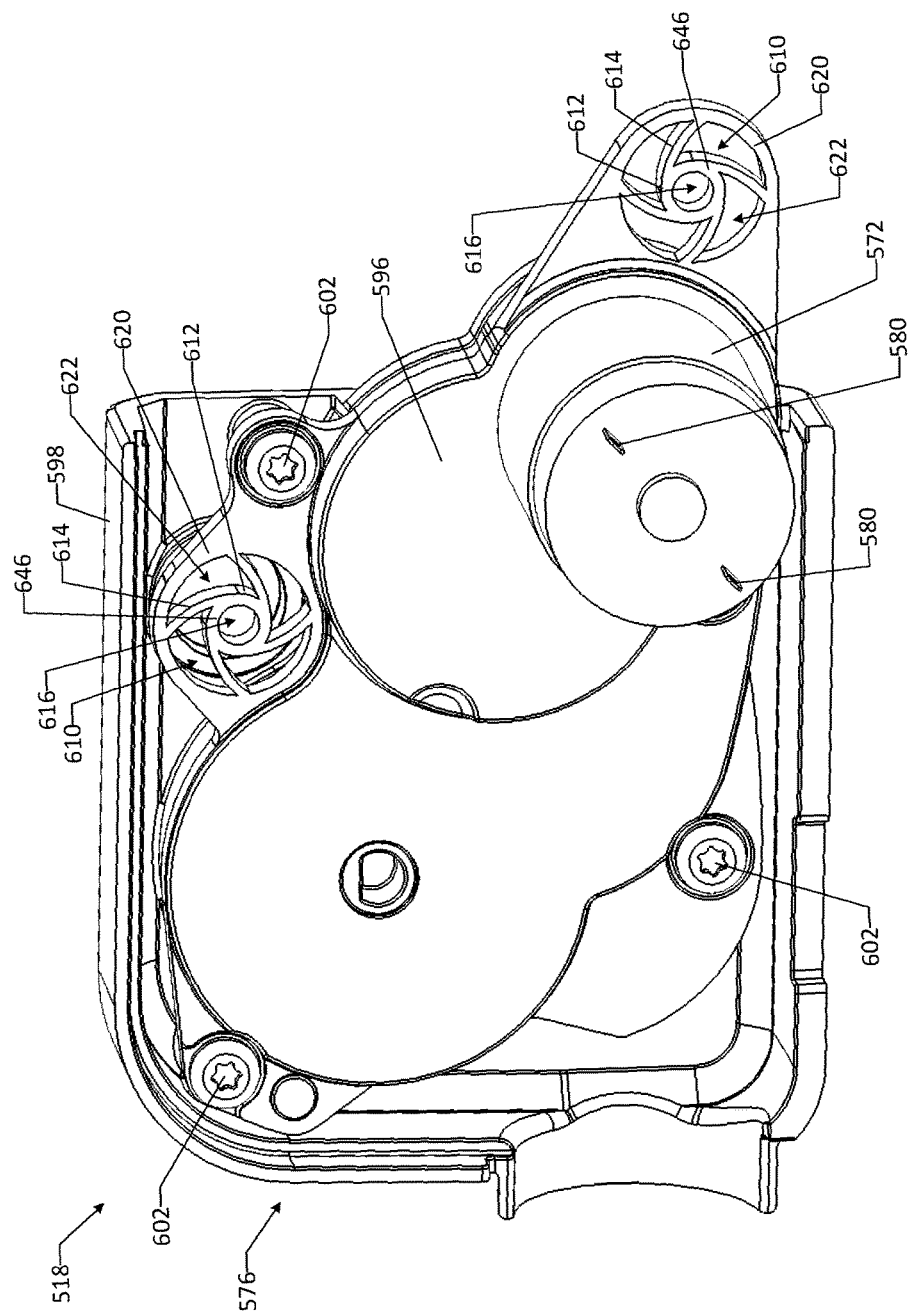
FIG. 3F is a detailed perspective view of the drive assembly, showing a motor and a drivetrain housing of the drive assembly.
Figure 3G:
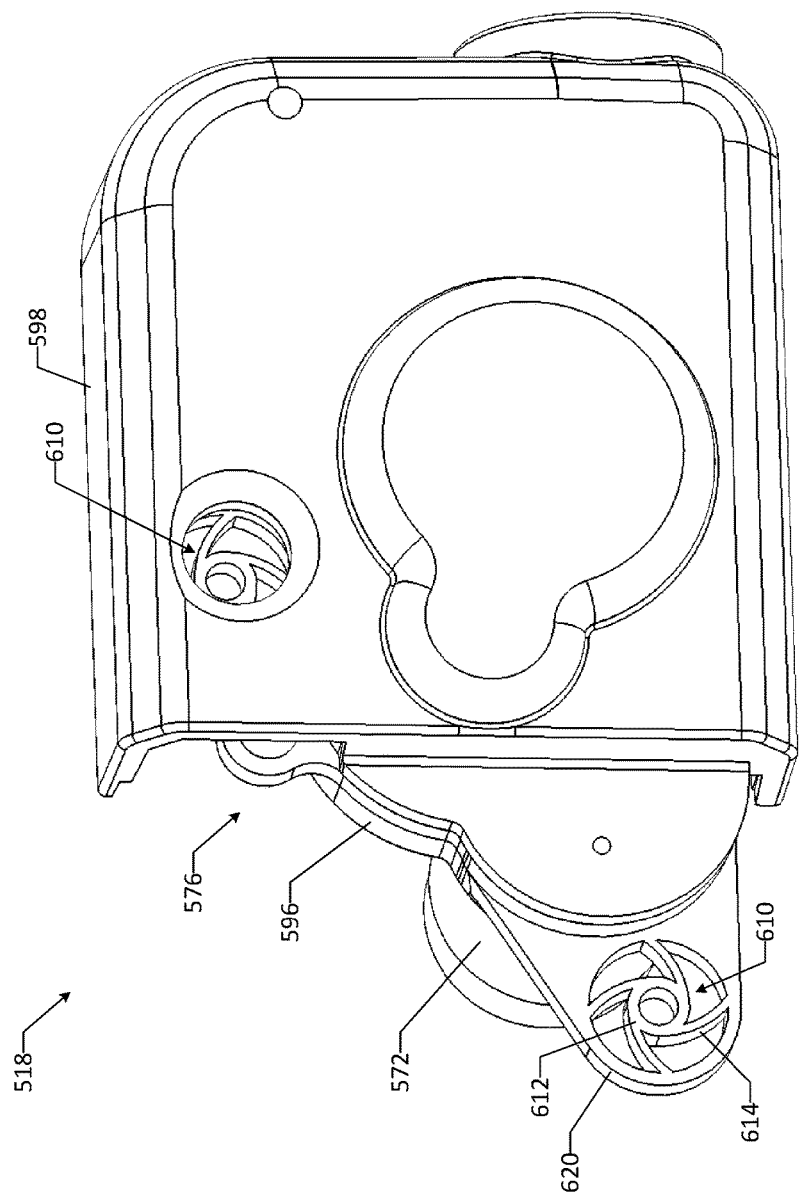
FIG. 3G is a detailed perspective view of the drive assembly, showing the motor and the drivetrain housing of the drive assembly.
Figure 3H:
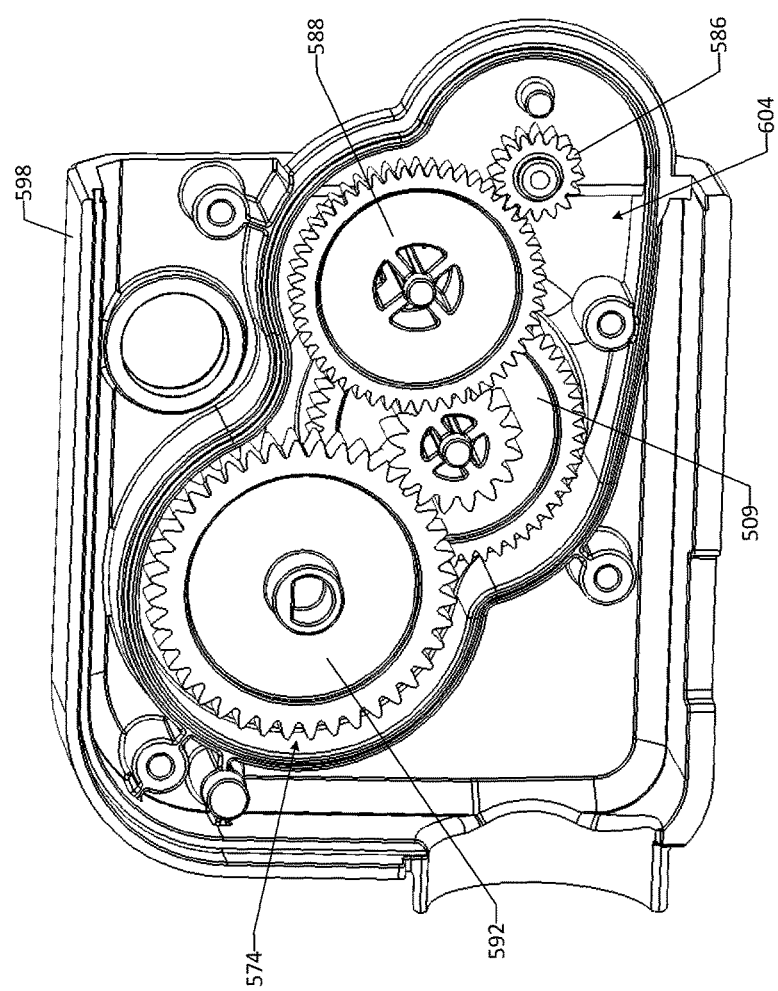
FIG. 3H is a detailed perspective view of a drivetrain and an outer portion of the drivetrain housing of the drive assembly.
Figure 31:
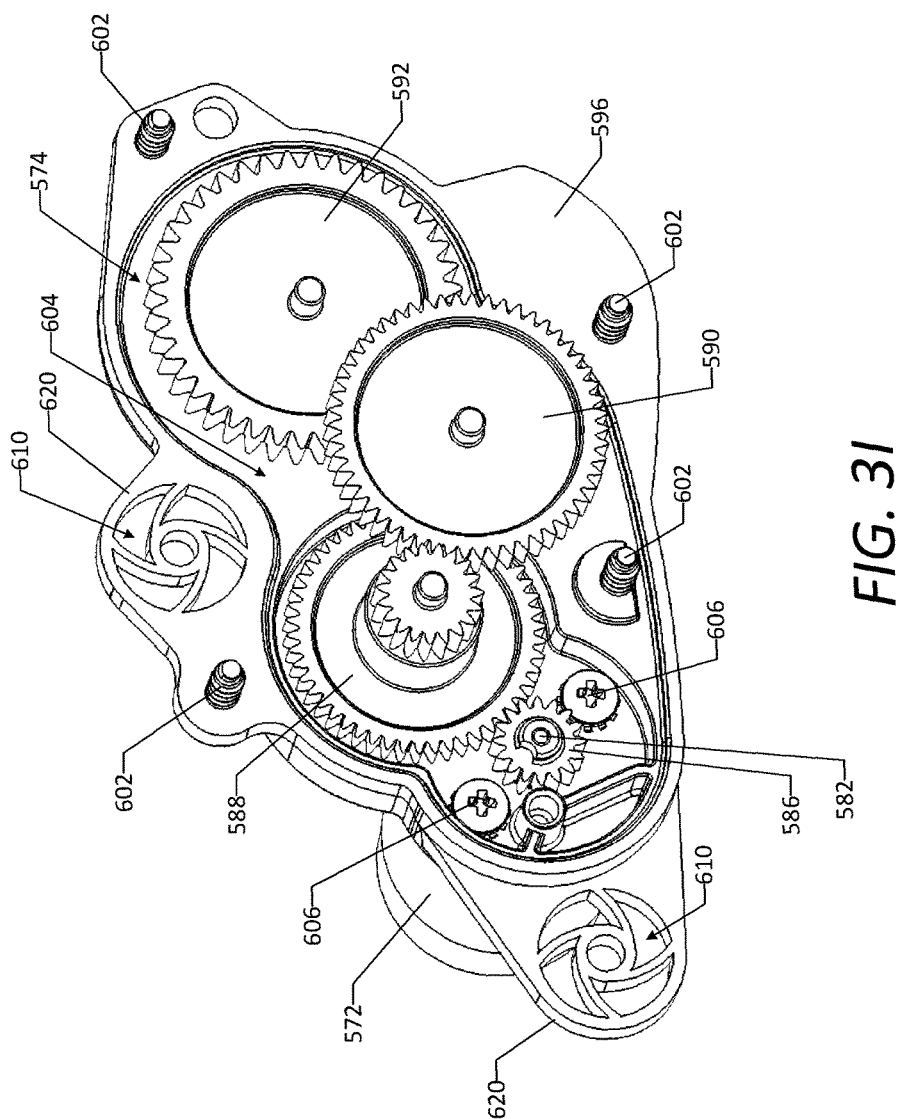
Figure 3J:
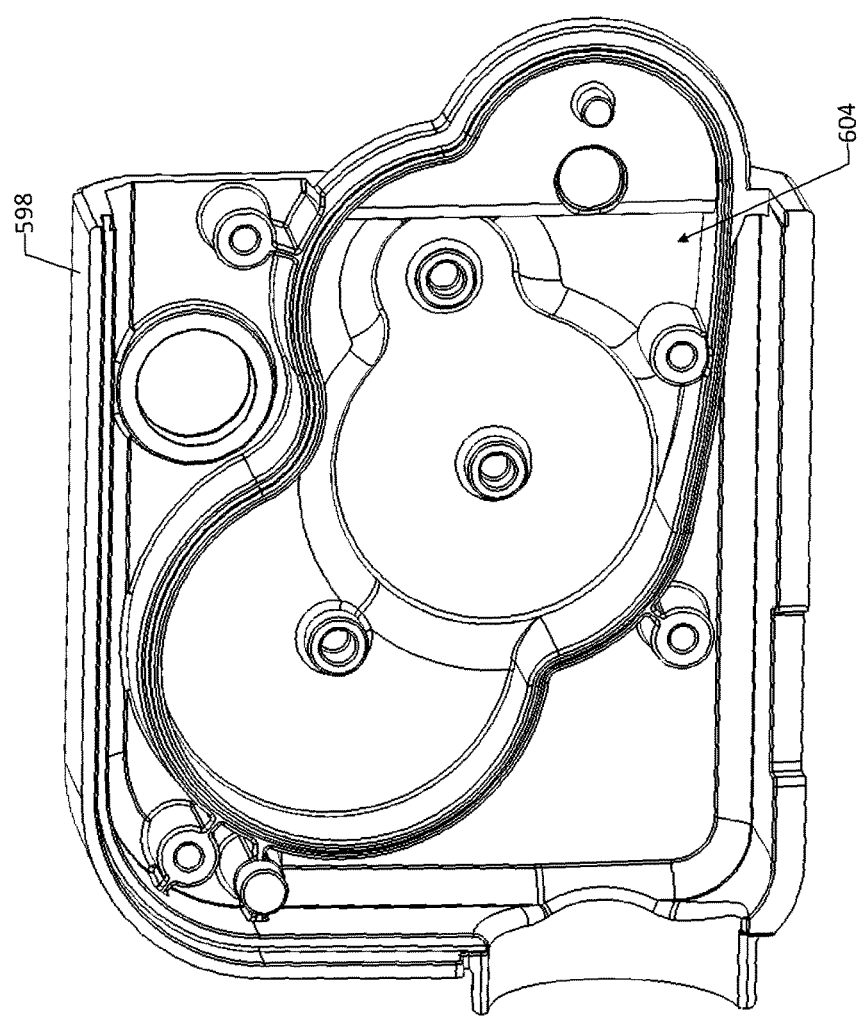
FIG. 3J is a detailed perspective view of the outer portion of the drivetrain housing.

The drive assembly 518 may be mounted to the chassis assembly 514, as shown in FIGS. 3A-3C. Details of the mounting arrangement are described herein below. In some embodiments, a portion of the drive assembly 518 is disposed within the housing 110, while another portion of the drive assembly 518 is disposed outside of the housing 110. In other embodiments, the drive assembly 518 is disposed entirely within the housing 110. Alternatively, the drive assembly 518 may be disposed entirely outside of the dispenser housing 110. In some embodiments, one or more exterior surfaces of the drive assembly 518 form a portion of the exterior of the dispenser 100. The foregoing embodiments are merely illustrative, as other configurations of the dispenser housing 110, the chassis assembly 514, and the drive assembly 518 are possible.

Details of the chassis assembly 514 are illustrated in FIGS. 3A-3E. As shown, the chassis assembly 514 may include a chassis frame 532, which may be configured to support various other components of the chassis assembly 514 as well as other portions of the dispenser 100. The chassis frame 532 may include a back wall 534, a front wall 536, a first side wall 538, and a second side wall 540. In some embodiments, the walls 534, 536, 538, 540 of the chassis frame 532 may be integrally formed within one another. In other embodiments, the walls 534, 536, 538, 540 of the chassis frame 532 may be separately formed and attached to one another. The back wall 534 may be configured to attach to a wall or other support surface for mounting the dispenser 100 thereto. The front wall 536 may be configured to support a control panel, which may include one or more controllers, sensors, indicators, switches, and/or buttons for controlling operation of the dispenser 100. The first side wall 538 and the second side wall 540 may be configured to support the base 124 of the dispenser housing 110. The first side wall 538 also may be configured to support the drive assembly 518.

As shown, the chassis frame 532 may include one or more mounting posts 544 extending outwardly from the first side wall 538 and configured to allow the drive assembly 518 to be mounted thereto. Although a pair of mounting posts 544 is shown in the illustrated embodiment, any number of mounting posts 544 may be used. In some embodiments, the mounting posts 544 are integrally formed with the first side wall 538. In other embodiments, the mounting posts 544 are formed separately from and attached to the first side wall 538. As shown, each mounting post 544 may have an outer diameter $OD_{MP}$ and a length $L_{MP}$. In some embodiments, each mounting post 544 is generally tubular in shape, defining a central opening extending along a longitudinal axis of the post 544. According to other embodiments, the mounting posts 544 may have other shapes configured to mate with an isolation bushing as described below. The central opening may be configured to receive a portion of a fastener therein. For example, the central opening of the mounting post 544 may be threaded to receive a mating threaded fastener, such as a screw or a bolt. In some embodiments, the mounting posts 544 may be omitted, and the first side wall 538 may include openings or other features configured to allow the drive assembly 518 to be mounted thereto. The chassis frame 532 also may include a motor opening 546 defined in the first side wall 538 and configured to receive a motor of the drive assembly 518 therein. Details of the mounting arrangement between the drive assembly 518 and the chassis assembly 514 are described herein below.

The chassis assembly 514 also may include a roller assembly 550 supported by the chassis frame 532 and configured to dispense the sheet product from the roll 102. The roller assembly 550 may include a drive roller 554 and a pinch roller 556 defining a nip therebetween for receiving and advancing the sheet product. As shown, the drive roller 554 may include a drive roller shaft 558, one or more drive roller sleeves 560 disposed over the drive roller shaft 558, and one or more rubber portions 562 disposed over the one or more drive roller sleeves 560. The drive roller 554 may be supported by and configured to rotate with respect to the chassis frame 532. As shown, a first end of the drive roller shaft 558 may extend through the first side wall 538 of the chassis frame 532 for attachment to the drive assembly 518, as described herein below. In a similar manner, a second end of the drive roller shaft 558 may extend through the second side wall 540 of the chassis frame 532.

As shown, the chassis assembly 514 also may include a dispensing chute 564 configured to guide the sheet product from the roller assembly 550 and out of the dispenser 100. The dispensing chute 564 may define a dispensing opening 566 configured to allow the sheet product to pass therethrough. In some embodiments, as shown, the dispensing opening 566 is disposed along a front of the chassis assembly 514. In other embodiments, the dispensing opening 566 may be disposed along other portions of the chassis assembly 514, such as along a bottom thereof. In some embodiments, as shown, the dispensing chute 564 is formed separately from and attached to the chassis frame 532. In other embodiments, the dispensing chute 564 is integrally formed with the chassis frame 532. The chassis assembly 514 also may include a tear bar 568 disposed about the dispensing opening 566 and configured to facilitate tearing of the sheet product by a user. In some embodiments, as shown, the tear bar 568 is formed separately from and attached to the chassis frame 532. In other embodiments, the tear bar 568 is integrally formed with the chassis frame 532. The foregoing embodiments are merely illustrative, as other configurations of the chassis assembly 514 are possible.

Details of the drive assembly 518 are illustrated in FIGS. 3A-3C and 3F-3K. As shown, the drive assembly 518 may include a motor 572, a drivetrain 574, and a drivetrain housing 576. The motor 572 may be an electric motor formed in a conventional manner and including a pair of wire connectors 580 and a motor output shaft 582. The drivetrain 574 may include a plurality of gears configured to be driven by the motor 572 and to drive the drive roller shaft 558. According to the illustrated embodiment, the drivetrain 574 may include a motor drive gear 586 (which also may be referred to herein as an "input gear"), a first intermediate gear 588, a second intermediate gear 590, and a drive roller gear 592 (which also may be referred to herein as an "output gear"). As shown, the motor drive gear 586 and the drive roller gear 592 may be single-step gears, and the first intermediate gear 588 and the second intermediate gear 590 may be two-step gears. The motor output shaft 582 may be coupled to and drive the motor drive gear 586. The motor drive gear 586 may engage and drive the first intermediate gear 588. The first intermediate gear 588 may engage and drive the second intermediate gear 590. The second intermediate gear 590 may engage and drive the drive roller gear 592. The drive roller gear 592 may be coupled to and drive the drive roller shaft 558. In this manner, operation of the motor 572 (i.e., rotation of the motor output shaft 582) may cause the drivetrain 574 to rotate the drive roller 554 for advancing the sheet product from the roll 102 and out of the dispenser 100.

The drivetrain housing 576 may enclose and support the drivetrain 574 therein. As shown, the drivetrain housing 576 may include an inner portion 596 (which also may be referred to herein as a "first drivetrain housing portion" or a "first portion") and an outer portion 598 (which also may be referred to herein as a "second drivetrain housing portion" or a "second portion"). The inner portion 596 and the outer portion 598 may be attached to one another via one or more housing fasteners 602. Although the housing fasteners 602 are shown as screws, other types of fasteners may be used. The inner portion 596 and the outer portion 598 of the drivetrain housing 576 may define an interior space 604 for receiving the drivetrain 574 therein. As shown in FIGS. 3H-3K, interior surfaces of the inner portion 596 and the outer portion 598 may be configured to receive and maintain the gears 586, 588, 590, 592 of the drivetrain 574 in a desired relationship for operation thereof. The motor 572 may be attached to and supported by the inner portion 596 of the drivetrain housing 576. In particular, as shown in FIG. 3I, the motor output shaft 582 may extend into the interior space 604 of the drivetrain housing 576 and the motor 572 may be attached to the inner portion 596 via one or more motor fasteners 606. Although the motor fasteners 606 are shown as screws, other types of fasteners may be used. The foregoing embodiments are merely illustrative, as other configurations of the drive assembly 518 are possible. The drive assembly 518 and the roller assembly 550 may be considered part of an automated dispensing mechanism of the automated sheet product dispenser 100.

As described above, the drive assembly 518 may be mounted to the chassis assembly 514. In particular, the drive assembly 518 may be mounted to the chassis assembly 514 via one or more isolation mounts 610 (which also may be referred to herein as "isolation supports" or "isolation members"), as shown. Although a pair of isolation mounts 610 is shown in the illustrated embodiment, any number of isolation mounts 610 may be used. In some embodiments, as shown, the isolation mounts 610 are a part of the drivetrain housing 576. In other words, the drivetrain housing 576 may include the isolation mounts 610. In other embodiments, the isolation mounts 610 may be separate from, but cooperate with, the drivetrain housing 576.

Figure 3K:
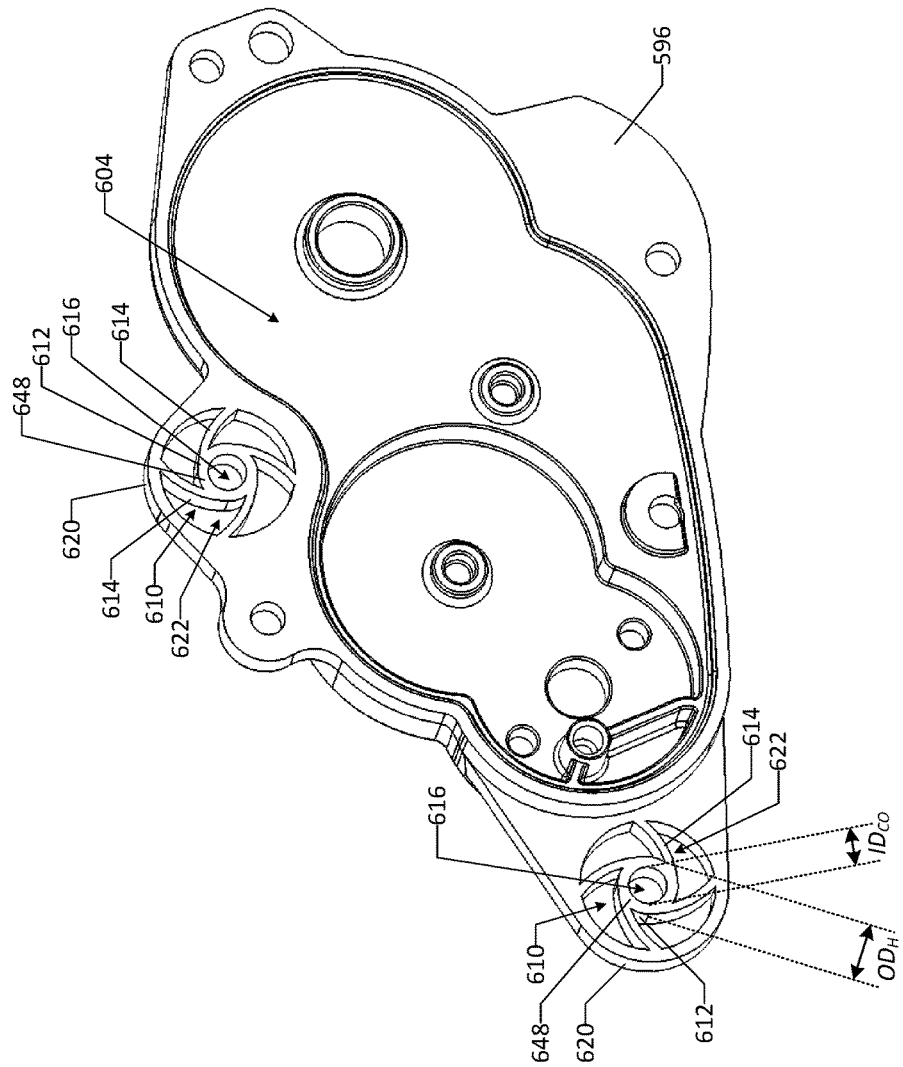
FIG. 3K is a detailed perspective view of the inner portion of the drivetrain housing.

The isolation mounts 610 are illustrated in detail in FIG. 3K. As shown, each isolation mount 610 may include a hub 612 (which also may be referred to herein as a "central hub") and a plurality of spokes 614 attached to and extending away from the hub 612. The hub 612 may have a generally tubular (annular) shape and a circular cross-sectional shape, although other shapes may be used, for example, to optimize the stiffness of the isolation mount 610. As shown, the hub 612 may include a central opening 616 extending therethrough along a longitudinal axis of the hub 612. The central opening 616 may have an inner diameter $ID_{CO}$, and the hub 612 may have an outer diameter $OD_H$, as shown. The spokes 614 may be formed as elongated members extending away from the hub 612 and arranged in a circumferential array with respect to the longitudinal axis of the hub 612. In some embodiments, as shown, each of the spokes 614 has an arced or curved shape that extends away from and partially around the hub 612. In other words, each of the spokes 614 may extend radially away from and partially circumferentially around the hub 612 with respect to the longitudinal axis of the hub 612. In other embodiments, each of the spokes 614 has a linear or straight shape that extends away from the hub 612. According to such embodiments, the spokes 614 may extend only radially away from the hub 612 with respect to the longitudinal axis of the hub 612 (i.e., the linear direction of the spoke 614 may intersect the longitudinal axis of the hub 612) or radially and partially circumferentially with respect to the longitudinal axis of the hub 612 (i.e., the linear direction of the spoke 614 may be offset from or angled with respect to the longitudinal axis of the hub 612). In still other embodiments, the spokes 614 may have other shapes or contours as well as other orientations with respect to the hub 612, for example, to optimize the stiffness of the isolation mount 610. In some embodiments, as shown, each spoke 614 has a cross-section that is constant or substantially constant along the length of the spoke 614 (i.e., from an inner end to an outer end of the spoke 614). In other embodiments, each spoke 614 has a cross-section that varies along the length of the spoke 614, for example, to optimize the stiffness of the isolation mount 610. As described in detail herein below, the spokes 614 may be configured to deflect, flex, or otherwise move with respect to the hub 612 in a manner that inhibits transmission of vibrations generated by the motor 572 and the drivetrain 574 to other components of the dispenser 100. The foregoing embodiments are merely illustrative, as other configurations of the isolation mounts 610 are possible.

As shown, the drive assembly 518 may include one or more mount supports 620 (which also may be referred to herein as "isolation mount supports") that support the one or more isolation mounts 610. In some embodiments, as shown in FIGS. 3I and 3K, the mount supports 620 are part of the inner portion 596 of the drivetrain housing 576 or integrally formed therewith. In other embodiments, the mount supports 620 are part of the outer portion 598 of the drivetrain housing 576 or integrally formed therewith. In still other embodiments, the mount supports 620 may be formed separately from and attached to either the inner portion 596 or the outer portion 598 of the drivetrain housing 576. According to the illustrated embodiment, the mount supports 620 are disposed along a periphery of the inner portion 596. Although a pair of mount supports 620 is shown, any number of mount supports 620 may be used to correspond to the number of isolation mounts 610 used.

As shown in FIGS. 3I and 3K, each mount support 620 may have a ring shape and may support the corresponding isolation mount 610 within an interior of the mount support 620. Each of the spokes 614 of the isolation mount 610 may be attached to the mount support 620, such that the spokes 614 extend from the hub 612 to the mount support 620. In this manner, the spokes 614 and the mount support 620 may define a plurality of mount openings 622 therebetween, which may allow the spokes 614 to deflect, flex, or otherwise move with respect to the hub 612 during operation of the drive assembly 618. As shown, the isolation mounts 610 may be fixedly attached to the mount supports 620 at the connection points between the spokes 614 and the respective mount support 620. In some embodiments, as shown, the isolation mounts 610 may be integrally formed with the respective mount supports 620, such that the isolation mounts 610 are part of the inner portion 596 of the drivetrain housing 576 (i.e., formed as a unitary component). In other embodiments, the isolation mounts 610 may be integrally formed with the respective mount supports 620, such that the isolation mounts 610 are part of the outer portion 598 of the drivetrain housing 576 (i.e., formed as a unitary component). Ultimately, the isolation mounts 610 and the mount supports 620 may be configured to affect the stiffness of the isolation mounts 610 in order to optimize the isolation mounts 610 for isolation of the drive assembly 518, as described below. The foregoing embodiments are merely illustrative, as other configurations of the isolation mounts 610 and the mount supports 620 are possible.

In some embodiments, the isolation mounts 610 are formed of the same material as the mount supports 620, for example, when the isolation mounts 610 are integrally formed with the mount supports 620 as part of the inner portion 596 or the outer portion 598 of the drivetrain housing 576. In such embodiments, the isolation mounts 610 and the mount supports 620 may be formed of a plastic material, a metal material, or a composite material, although other suitable materials may be used. For example, the isolation mounts 610 and the mount supports 620 may be formed of a plastic material via injection molding.

In other embodiments, the isolation mounts 610 and the mount supports 620 are formed of different materials, for example, when the isolation mounts 610 are separately formed from the mount supports 620. In such embodiments, the isolation mounts 610 and the mount supports 620 may be formed of a plastic material, a metal material, or a composite material, although other suitable materials may be used. For example, the isolation mounts 610 may be formed of a first plastic material, and the mount supports 620 may be formed of a different, second plastic material. In such embodiments, the isolation mounts 610 and the mount supports 620 may be separately molded and attached to one another, over-molded, or co-molded, although other suitable methods of forming the isolation mounts 610 and the mount supports 620 may be used.

As shown in FIGS. 3A-3C, the drive assembly 518 may be securely mounted to the chassis assembly 514 via the one or more mounting posts 544, the one or more isolation mounts 610, and one or more mounting fasteners 642. Each isolation mount 610 may be aligned with and disposed adjacent to the respective mounting post 544, such that an inner surface 646 of the hub 612 abuts a tip end of the mounting post 544. In some embodiments, as shown, the outer diameter $OD_H$ of the hub 612 is equal to the outer diameter $OD_{MP}$ of the mounting post 544. In this manner, the spokes 614 of the isolation mount 610 and the mounting post 544 do not directly contact one another (i.e., the spokes 614 and the mounting post 544 are entirely spaced apart from one another). In other embodiments, the outer diameter $OD_H$ of the hub 612 is greater than the outer diameter $OD_{MP}$ of the mounting post 544, such that the spokes 614 and the mounting post 544 do not directly contact one another. A respective fastener 642 may extend through the central opening 616 of the hub 612 and be threaded or otherwise attached to the mounting post 544, such as via the central opening of the mounting post 544, to secure the isolation mount 610 to the mounting post 544. Although the mounting fasteners 642 are shown as screws, other types of fasteners may be used. As shown, the mounting fastener 642 may include a head configured to retain the isolation mount 610 to the mounting post 544. In such embodiments, the head of the mounting fastener 642 may have an outer diameter $OD_{FH}$ that is greater than the inner diameter $ID_{CO}$ of the central opening 616 of the hub 612, such that the hub 612 is retained in abutment with the mounting post 544 by the fastener 642. As shown, the outer diameter $OD_{FH}$ of the head of the mounting fastener 642 also may be less than or equal to the outer diameter $OD_H$ of the hub 612, such that the spokes 614 of the isolation mount 610 and the head of the mounting fastener 642 do not directly contact one another (i.e., the spokes 614 and the head are entirely spaced apart from one another). In some embodiments, a mounting washer is positioned between the head of the mounting fastener 642 and an outer surface 648 of the hub 612. In this manner, the mounting washer may abut the outer surface 648 of the hub, and the head of the mounting fastener 642 may abut the outer surface of the mounting washer. In such embodiments, an outer diameter of the mounting washer may be less than or equal to the outer diameter $OD_H$ of the hub 612, such that the spokes 614 of the isolation mount 610 and the mounting washer do not directly contact one another (i.e., the spokes 614 and the mounting washer are entirely spaced apart from one another).

In some embodiments, the mounting posts 544 may be omitted, and the drive assembly 518 may be securely mounted to the chassis assembly 514 via one or more openings defined in the first side wall 536 of the chassis frame 532, the one or more isolation mounts 610, and one or more mounting fasteners 642. For example, a respective fastener 642 may extend through the central opening 616 of the hub 612 and be threaded or otherwise attached to the opening in the first side wall 536 to secure the isolation mount 610 to the chassis frame 532. In some such embodiments, the hub 612 of the isolation mount 610 may have a length in the direction of the longitudinal axis of the hub 612 that is greater than a length of each of the spokes 614 in the direction of the longitudinal axis of the hub 612. In this manner, the inner surface of the hub 612 may abut the first side wall 536, while the spokes 614 and the first side wall 536 do not directly contact one another (i.e., the spokes 614 and the first side wall 536 are entirely spaced apart from one another). In other such embodiments, another component or portion of the drivetrain housing 576 may abut the first side wall 536, while neither the hub 612 nor the spokes 614 directly contacts the first side wall 536 (i.e., the hub 612 and the spokes 614 are entirely spaced apart from the first side wall 536).

As shown, the drive assembly 518 may be mounted to the chassis assembly 514 such that the motor 572 is disposed within the motor opening 546 of the chassis frame 532. The motor 572 may be disposed within the motor opening 546 such that the motor 572 is entirely spaced apart from the chassis frame 532. In other words, the motor 572 may be disposed within the motor opening 546 such that no portion of the motor 572 directly contacts any portion of the chassis frame 532. The motor 572 may be connected to a power supply, which may include one or more batteries, via wires extending between the wire connectors 580 and the power supply. In some embodiments, the power supply is supported by the chassis frame 532.

In some embodiments, as shown, the drive assembly 518 (i.e., the motor 572, the drivetrain 574, and the drivetrain housing 574) is mounted to the chassis assembly 514, via the mounting posts 544, the isolation mounts 610, and the mounting fasteners 642, such that the drive assembly 518 is entirely spaced apart from the chassis frame 532 except for the mounting posts 544 contacting the hubs 612 of the isolation mounts 610 (when the isolation mounts 610 are a part of (i.e., are integrally formed with) one of the portions 596, 598 of the drivetrain housing 574). In other words, the drive assembly 518 may be mounted to the chassis assembly 514 such that no portion of the drive assembly 518 directly contacts any portion of the chassis frame 532 except for the mounting posts 544 contacting the hubs 612 of the isolation mounts 610 (when the isolation mounts 610 are a part of (i.e., are integrally formed with) one of the portions 596, 598 of the drivetrain housing 574). In some embodiments, as shown, the drive assembly 518 is mounted to the chassis assembly 514 such that the drive assembly 518 is entirely spaced apart from the chassis assembly 514 except for the mounting posts 544 contacting the hubs 612 of the isolation mounts 610 (when the isolation mounts 610 are a part of (i.e., are integrally formed with) one of the portions 596, 598 of the drivetrain housing 574) and the drive roller shaft 558 contacting the drive roller gear 592. In other words, the drive assembly 518 may be mounted to the chassis assembly 514 such that no portion of the drive assembly 518 except for the hubs 612 and the drive roller gear 592 directly contacts any portion of the chassis assembly 514. In some embodiments, as shown, the drive assembly 518 is mounted to the chassis assembly 514 such that the drive assembly 518 is entirely spaced apart from the dispenser housing 510. In other words, the drive assembly 518 may be mounted to the chassis assembly 514 such that no portion of the drive assembly 518 directly contacts any portion of the dispenser housing 510.

In other embodiments, the drive assembly 518 (i.e., the motor 572, the drivetrain 574, and the drivetrain housing 574) is mounted to the chassis assembly 514, via the mounting posts 544, the isolation mounts 610, and the mounting fasteners 642, such that the drive assembly 518 is entirely spaced apart from the chassis frame 532 (when the isolation mounts 610 are not a part of (i.e., are separately formed from and attached to) one of the portions 596, 598 of the drivetrain housing 574). In other words, the drive assembly 518 may be mounted to the chassis assembly 514 such that no portion of the drive assembly 518 directly contacts any portion of the chassis frame 532 (when the isolation mounts 610 are not a part of (i.e., are separately formed from and attached to) one of the portions 596, 598 of the drivetrain housing 574). According to such embodiments, the drive assembly 518 directly contacts only the isolation mounts 610, which directly contact the chassis assembly 514 as described above, and the drive roller shaft 558. In some embodiments, the drive assembly 518 is mounted to the chassis assembly 514 such that the drive assembly 518 is entirely spaced apart from the chassis assembly 514 except for the drive roller shaft 558 contacting the drive roller gear 592. In other words, the drive assembly 518 may be mounted to the chassis assembly 514 such that no portion of the drive assembly 518 except for the drive roller gear 592 directly contacts any portion of the chassis assembly 514.

In some embodiments, the drive assembly 518 (i.e., the motor 572, the drivetrain 574, and the drivetrain housing 574) is mounted to the chassis assembly 514, via the openings defined in the first side wall 536 of the chassis frame 532, the isolation mounts 610, and the mounting fasteners 642, such that the drive assembly 518 is entirely spaced apart from the chassis frame 532 except for the first side wall 536 contacting the hubs 612 of the isolation mounts 610 (when the isolation mounts 610 are a part of (i.e., are integrally formed with) one of the portions 596, 598 of the drivetrain housing 574). In other words, the drive assembly 518 may be mounted to the chassis assembly 514 such that no portion of the drive assembly 518 directly contacts any portion of the chassis frame 532 except for the first side wall 536 contacting the hubs 612 of the isolation mounts 610 (when the isolation mounts 610 are a part of (i.e., are integrally formed with) one of the portions 596, 598 of the drivetrain housing 574). In some embodiments, the drive assembly 518 is mounted to the chassis assembly 514 such that the drive assembly 518 is entirely spaced apart from the chassis assembly 514 except for the first side wall 536 contacting the hubs 612 of the isolation mounts 610 (when the isolation mounts 610 are a part of (i.e., are integrally formed with) one of the portions 596, 598 of the drivetrain housing 574) and the drive roller shaft 558 contacting the drive roller gear 592. In other words, the drive assembly 518 may be mounted to the chassis assembly 514 such that no portion of the drive assembly 518 except for the hubs 612 and the drive roller gear 592 directly contacts any portion of the chassis assembly 514.

In other embodiments, the drive assembly 518 (i.e., the motor 572, the drivetrain 574, and the drivetrain housing 574) is mounted to the chassis assembly 514, via the openings defined in the first side wall 536 of the chassis frame 532, the isolation mounts 610, and the mounting fasteners 642, such that the drive assembly 518 is entirely spaced apart from the chassis frame 532 (when the isolation mounts 610 are not a part of (i.e., are separately formed from and attached to) one of the portions 596, 598 of the drivetrain housing 574). In other words, the drive assembly 518 may be mounted to the chassis assembly 514 such that no portion of the drive assembly 518 directly contacts any portion of the chassis frame 532 (when the isolation mounts 610 are not a part of (i.e., are separately formed from and attached to) one of the portions 596, 598 of the drivetrain housing 574). According to such embodiments, the drive assembly 518 directly contacts only the isolation mounts 610, which directly contact the chassis assembly 514 as described above, and the drive roller shaft 558. In some embodiments, the drive assembly 518 is mounted to the chassis assembly 514 such that the drive assembly 518 is entirely spaced apart from the chassis assembly 514 except for the drive roller shaft 558 contacting the drive roller gear 592. In other words, the drive assembly 518 may be mounted to the chassis assembly 514 such that no portion of the drive assembly 518 except for the drive roller gear 592 directly contacts any portion of the chassis assembly 514.

The automated sheet product dispenser 100 described herein advantageously isolates the drive assembly 518 and inhibits transmission of vibrations generated by the motor 572 and the drivetrain 574 to other components of the dispenser 100, such as components of the chassis assembly 514 and the dispenser housing 110. In particular, the mounting arrangement of the drive assembly 518 to the chassis assembly 514, via the isolation mounts 610, inhibits such vibration transmission, thereby limiting sound power levels emitted during operation of the automated sheet product dispenser 100. According to the described embodiments in which the isolation mounts 610 are a part of (i.e., integrally formed with) a portion of the drivetrain housing 576, the mounting arrangement of the drive assembly 518 to the chassis assembly 514 advantageously eliminates the need for a separate isolation component to inhibit vibration transmission. In this manner, effective isolation may be achieved with fewer components, which may reduce cost and ease manufacture and assembly of the dispenser 100.

Certain aspects of the mounting arrangement of the drive assembly 518 to the chassis assembly 514 may be selected to minimize the transmissibility of the mounting arrangement and thereby maximize the vibration isolation of the drive assembly 618, according to the following relationship: isolation=1−transmissibility. As will be understood, the transmissibility of the mounting arrangement is a function of the forcing frequency and the natural frequency of the isolation mounts 610, according to the following relationship: transmissibility=|1/(1−(forcing frequency/natural frequency)$^2$)|. The natural frequency of the isolation mounts 610 generally is affected by the durometer of the material of the mounts 610 as well as the geometry of the mounts 610 and the components that contact the mounts 610 (i.e., the mounting posts 544 or the first side wall 538, and the bushing supports 620). In this manner, use of a lower durometer material for the isolation mounts 610 may result in a lower natural frequency of the mounts 610. Additionally, as described above, the size, geometry, and arrangement of the spokes 614 of the isolation mounts 610 may cause the spokes to deflect, flex, or otherwise move in a manner that lowers the stiffness of the mounts 610 and thereby results in a lower natural frequency of the mounts 610. Ultimately, the durometer of the material of the mounts 610 and the size, geometry, and arrangement of the spokes 614 may be selected to result in a relatively low natural frequency of the mounts 610, thereby minimizing the transmissibility of the mounting arrangement and maximizing the vibration isolation of the drive assembly 618. In some embodiments, the natural frequency of the mounting arrangement is less than 20 Hz. In some embodiments, the transmissibility of the mounting arrangement is less than 50% (i.e., less than 0.5) and the vibration isolation of the drive assembly 618 is greater than 50% (i.e., greater than 0.5).

It will be understood that the automated product dispensers and related methods described above are not limited to automated sheet product dispensers. The described mounting arrangement of a drive assembly and a chassis assembly, via one or more isolation mounts, is similarly applicable to other automated product dispensers, such as automated flowable material dispensers, automated cutlery dispensers, automated air freshener dispensers, and other types of automated product dispensers. In particular, the described mounting arrangement may be used in any type of automated product dispenser to advantageously limit sound power levels emitted during operation of an automated dispensing mechanism including a motor and a drivetrain.

Although certain embodiments of the disclosure are described herein and shown in the accompanying drawings, one of ordinary skill in the art will recognize that numerous modifications and alternative embodiments are within the scope of the disclosure. Moreover, although certain embodiments of the disclosure are described herein with respect to specific automated product dispenser configurations, it will be appreciated that numerous other automated product dispenser configurations are within the scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements, or functional capabilities. Thus, such conditional language generally is not intended to imply that certain features, elements, or functional capabilities are in any way required for all embodiments.

We claim:

1. An automated product dispenser for dispensing a product from a supply of product, the dispenser comprising:
 a chassis assembly comprising a chassis frame;
 a drive assembly comprising a motor, a drivetrain, and a drivetrain housing, wherein the drivetrain comprises a plurality of gears disposed within the drivetrain housing, and wherein the drivetrain housing comprises a first drivetrain housing portion and a second drivetrain housing portion attached to one another and enclosing the drivetrain; and
 an isolation member for mounting the drive assembly to the chassis assembly such that the drive assembly is substantially spaced apart from the chassis frame.

2. The automated product dispenser of claim 1, wherein the isolation member is an isolation bushing disposed between the drive assembly and the chassis assembly, and wherein the drive assembly is mounted to the chassis assembly via the isolation bushing such that the drive assembly is entirely spaced apart from the chassis frame.

3. The automated product dispenser of claim 2, wherein the chassis frame comprises a mounting post, and wherein the isolation bushing is disposed over the mounting post such that the mounting post extends at least partially through a central opening of the isolation bushing.

4. The automated product dispenser of claim 3, further comprising a mounting fastener and a mounting washer, wherein the mounting fastener extends through the mounting washer and is attached to the mounting post such that the isolation bushing is secured to the mounting post.

5. The automated product dispenser of claim 3, wherein a length of the mounting post is greater than or equal to a length of the isolation bushing, such that a tip end of the mounting post protrudes from the central opening of the isolation bushing or is flush with a respective end of the isolation bushing.

6. The automated product dispenser of claim 2, wherein the drivetrain housing comprises a bushing support comprising a pair of arms defining a generally C-shaped profile of the bushing support, and wherein a portion of the isolation bushing is disposed within a bushing opening of the bushing support.

7. The automated product dispenser of claim 6, wherein the bushing support comprises a protrusion contacting a portion of the isolation bushing, and wherein the protrusion compresses or deflects the portion of the isolation bushing.

8. The automated product dispenser of claim 6, wherein the isolation bushing comprises a central body portion, a first flange disposed at a first end of the isolation bushing, and a second flange disposed at a second end of the isolation bushing, and wherein the central body portion is disposed within the bushing opening of the bushing support.

9. The automated product dispenser of claim 6, wherein the isolation bushing comprises a protrusion contacting a portion of the bushing support, and wherein the protrusion contacts the portion of the bushing support such that a portion of the isolation bushing is compressed or deflected by the bushing support.

10. The automated product dispenser of claim 2, wherein the isolation bushing is formed of an elastomeric material.

11. The automated product dispenser of claim 1, wherein the isolation member is an isolation mount associated with the drivetrain housing, and wherein the isolation mount comprises a hub and a plurality of spokes attached to the hub.

12. The automated product dispenser of claim 11, wherein the drive assembly is entirely spaced apart from the chassis frame except for the hub contacting the chassis frame.

13. The automated product dispenser of claim 11, wherein the isolation mount is integrally formed with a portion of the drivetrain housing.

14. The automated product dispenser of claim 11, wherein the chassis frame comprises a mounting post, wherein the hub abuts the mounting post, and wherein the spokes are entirely spaced apart from the chassis frame.

15. The automated product dispenser of claim 11, wherein the drivetrain housing further comprises a mount support, wherein each of the spokes is attached to the mount support, and wherein the isolation mount is integrally formed with the mount support.

16. The automated product dispenser of claim 11, wherein each of the spokes has an arced or curved shape extending radially away from the hub and partially circumferentially around the hub with respect to a longitudinal axis of the hub, and wherein each of the spokes is configured to deflect, flex, or otherwise move with respect to the hub.

17. The automated product dispenser of claim 1, wherein a natural frequency of the isolation member is less than 20 Hz, and wherein a vibration isolation of the drive assembly is greater than 50 percent.

18. The automated product dispenser of claim 1, wherein the dispenser is configured to dispense sheet product from a supply of sheet product supported by the dispenser, wherein the chassis assembly further comprises a roller assembly supported by the chassis frame and configured to dispense the sheet product from the supply of sheet product, and wherein the roller assembly comprises a drive roller, and wherein the drivetrain is coupled to and configured to drive the drive roller.

19. The automated product dispenser of claim 1, wherein the dispenser is configured to dispense flowable material from a supply of flowable material supported by the dispenser, wherein the chassis assembly further comprises a pump assembly supported by the chassis frame and configured to dispense the flowable material from the supply of flowable material, wherein the pump assembly comprises a pump and an actuator plate, and wherein the drivetrain engages and is configured to move the actuator plate.

20. The automated product dispenser of claim 1, further comprising a dispenser housing, wherein the drive assembly is entirely spaced apart from the dispenser housing, wherein the dispenser housing comprises a base and a cover, and wherein the cover is movably connected to the base.

21. An automated product dispenser for dispensing a product from a supply of product, the dispenser comprising:
   a chassis assembly comprising a chassis frame;
   a drive assembly comprising a motor, a drivetrain, and a drivetrain housing;
   an isolation member for mounting the drive assembly to the chassis assembly such that the drive assembly is substantially spaced apart from the chassis frame; and
   a dispenser housing, wherein the drive assembly is entirely spaced apart from the dispenser housing, wherein the dispenser housing comprises a base and a cover, and wherein the cover is movably connected to the base.

22. The automated product dispenser of claim 21, wherein the chassis assembly is disposed at least partially within the dispenser housing.

23. An automated product dispenser for dispensing a product from a supply of product, the dispenser comprising:
   a chassis assembly comprising a chassis frame;
   a drive assembly comprising a motor, a drivetrain, and a drivetrain housing; and
   an isolation mount for mounting the drive assembly to the chassis assembly such that the drive assembly is substantially spaced apart from the chassis frame, wherein the isolation mount is associated with the drivetrain housing, and wherein the isolation mount comprises a hub and a plurality of spokes attached to the hub.

24. The automated product dispenser of claim 23, wherein the drive assembly is entirely spaced apart from the chassis frame except for the hub contacting the chassis frame.

25. The automated product dispenser of claim 23, wherein the isolation mount is integrally formed with a portion of the drivetrain housing.

26. The automated product dispenser of claim 23, wherein the chassis frame comprises a mounting post, wherein the hub abuts the mounting post, and wherein the spokes are entirely spaced apart from the chassis frame.

27. The automated product dispenser of claim 23, wherein the drivetrain housing further comprises a mount support, wherein each of the spokes is attached to the mount support, and wherein the isolation mount is integrally formed with the mount support.

28. The automated product dispenser of claim 23, wherein each of the spokes has an arced or curved shape extending radially away from the hub and partially circumferentially around the hub with respect to a longitudinal axis of the hub, and wherein each of the spokes is configured to deflect, flex, or otherwise move with respect to the hub.

29. An automated product dispenser for dispensing a product from a supply of product, the dispenser comprising:
   a chassis assembly comprising a chassis frame;
   a drive assembly comprising a motor, a drivetrain, and a drivetrain housing; and
   an isolation member for mounting the drive assembly to the chassis assembly such that the drive assembly is substantially spaced apart from the chassis frame, wherein a natural frequency of the isolation member is less than 20 Hz, and wherein a vibration isolation of the drive assembly is greater than 50 percent.

30. The automated product dispenser of claim 29, wherein the isolation member is an isolation bushing disposed between the drive assembly and the chassis assembly, and wherein the drive assembly is mounted to the chassis assembly via the isolation bushing such that the drive assembly is entirely spaced apart from the chassis frame.

31. An automated product dispenser for dispensing a product from a supply of product supported by the dispenser, the dispenser comprising:
   a chassis assembly comprising a chassis frame;
   a drive assembly comprising a motor, a drivetrain, and a drivetrain housing; and
   an isolation member for mounting the drive assembly to the chassis assembly such that the drive assembly is substantially spaced apart from the chassis frame;
   wherein the dispenser is configured to dispense sheet product from a supply of sheet product supported by the dispenser, wherein the chassis assembly further comprises a roller assembly supported by the chassis frame and configured to dispense the sheet product from the supply of sheet product, wherein the roller assembly comprises a drive roller, and wherein the drivetrain is coupled to and configured to drive the drive roller.

32. The automated product dispenser of claim 31, wherein the isolation member is an isolation bushing disposed between the drive assembly and the chassis assembly, and wherein the drive assembly is mounted to the chassis assembly via the isolation bushing such that the drive assembly is entirely spaced apart from the chassis frame.

33. An automated product dispenser for dispensing a product from a supply of product supported by the dispenser, the dispenser comprising:
   a chassis assembly comprising a chassis frame;
   a drive assembly comprising a motor, a drivetrain, and a drivetrain housing; and
   an isolation member for mounting the drive assembly to the chassis assembly such that the drive assembly is substantially spaced apart from the chassis frame;
   wherein the dispenser is configured to dispense flowable material from a supply of flowable material supported by the dispenser, wherein the chassis assembly further comprises a pump assembly supported by the chassis frame and configured to dispense the flowable material from the supply of flowable material, wherein the pump assembly comprises a pump and an actuator plate, and wherein the drivetrain engages and is configured to move the actuator plate.

34. The automated product dispenser of claim 33, wherein the isolation member is an isolation bushing disposed between the drive assembly and the chassis assembly, and wherein the drive assembly is mounted to the chassis assembly via the isolation bushing such that the drive assembly is entirely spaced apart from the chassis frame.

* * * * *

UNITED STATES PATENT AND TRADEMARK OFFICE
CERTIFICATE OF CORRECTION

PATENT NO. : 10,215,270 B2
APPLICATION NO. : 15/264683
DATED : February 26, 2019
INVENTOR(S) : Antonio Michael Cittadino et al.

Page 1 of 1

It is certified that error appears in the above-identified patent and that said Letters Patent is hereby corrected as shown below:

In the Claims

In Column 34, Lines 12-13 (Claim 18, Lines 6-7), change "product, and wherein" to -- product, wherein --.

Signed and Sealed this
Sixteenth Day of April, 2019

Andrei Iancu
*Director of the United States Patent and Trademark Office*